US007929600B2

(12) United States Patent
Moriya et al.

(10) Patent No.: US 7,929,600 B2

(45) Date of Patent: Apr. 19, 2011

(54) MULTI-CHANNEL SIGNAL ENCODING METHOD, DECODING METHOD, DEVICE THEREOF, PROGRAM, AND RECORDING MEDIUM THEREOF

(75) Inventors: Takehiro Moriya, Nerima-ku (JP); Yutaka Kamamoto, Bunkyo-ku (JP); Shigeki Sagayama, Bunkyo-ku (JP)

(73) Assignees: Nippon Telegraph and Telephone Corporation, Tokyo (JP); Toudai TLO, Ltd., Tokyo (JP)

( * ) Notice: Subject to any disclaimer, the term of this patent is extended or adjusted under 35 U.S.C. 154(b) by 1176 days.

(21) Appl. No.: 11/597,905

(22) PCT Filed: Jun. 30, 2005

(86) PCT No.: PCT/JP2005/012084

§ 371 (c)(1),
(2), (4) Date: Nov. 29, 2006

(87) PCT Pub. No.: WO2006/003993

PCT Pub. Date: Jan. 12, 2006

(65) Prior Publication Data

US 2008/0071548 A1 Mar. 20, 2008

(30) Foreign Application Priority Data

Jul. 2, 2004 (JP) ................................ 2004-197129

(51) Int. Cl.
*H04B 1/66* (2006.01)

(52) U.S. Cl. ........ 375/240; 375/264; 375/340; 382/233; 382/234; 348/397.1; 348/400.1; 348/409.1

(58) Field of Classification Search .................. 375/240, 375/240.12, 240.13, 244, 254, 260, 264, 375/296, 340, 346; 382/233, 234, 238, 239, 382/304; 348/384.1, 388.1, 397.1, 400.1, 348/401.1, 409.1, 410.1, 437.1
See application file for complete search history.

(56) References Cited

U.S. PATENT DOCUMENTS 7,773,670 B1 * 8/2010 Puri et al. ................ 375/240.01
(Continued)

FOREIGN PATENT DOCUMENTS

EP 1 400 955 A2 3/2004
(Continued)

OTHER PUBLICATIONS

Yutaka Kamamoto et al., "Lossless Compression of Multi-Channel Signals Using Inter-Channel Correlation", Dai 3 Kai Forum on Information Technology Koen Ronbunshu, pp. 123-124, 2004.

(Continued)

*Primary Examiner* — Dac V Ha
(74) *Attorney, Agent, or Firm* — Oblon, Spivak, McClelland, Maier & Neustadt, L.L.P.

(57) ABSTRACT

In difference coding, each of a first to M-th channel signals is divided into frames and independent energy of every channel signal and difference energy of difference signals between all channel signals are calculated for each frame. In ascending order of energy, if a signal corresponding to an energy value is independent signal, it is determined that independent coding should be used for the signal. If the signal is a difference signal and the type of coding for one of channel signals has been determined, it is determined that the other should be difference-coded using the former channel signal as a reference signal. If the type of coding for neither of the channel signals has been determined, it is determined that one of them should be independently coded and the other should be difference-coded using the former channel signal as a reference signal.

24 Claims, 17 Drawing Sheets

U.S. PATENT DOCUMENTS

| | | | | |
|---|---|---|---|---|
| 2004/0028126 | A1* | 2/2004 | Inokuchi | 375/240 |
| 2004/0161116 | A1 | 8/2004 | Tsuji et al. | |
| 2004/0234143 | A1* | 11/2004 | Hagai et al. | 382/238 |

FOREIGN PATENT DOCUMENTS

| | | |
|---|---|---|
| JP | 8 162968 | 6/1996 |
| JP | 2000 13817 | 1/2000 |
| JP | 2003 337598 | 11/2003 |
| JP | 2004 198559 | 7/2004 |
| JP | 2005 115267 | 4/2005 |

OTHER PUBLICATIONS

Konstantinos Konstantinides, "An Introduction to Super Audio CD and DVD-Audio", IEEE Signal Processing Magazine, pp. 71-82, 2003.

Yutaka Kamamoto, et al., "Lossless Compression of Multi-channel Signals Using Inter-channel Correlation", Joho Shori Gakkai Ronbunshi-Transactions of Information Processing Society of Japan, vol. 46, No. 5, XP-008077545, pp. 1118-1128 (with English translation).

* cited by examiner

MULTI-CHANNEL SIGNAL ENCODING METHOD, DECODING METHOD, DEVICE THEREOF, PROGRAM, AND RECORDING MEDIUM THEREOF

TECHNICAL FIELD

The present invention relates to a coding method used for recording and transmitting multichannel signals such as audio signals and medical signals, a decoding method, an apparatus and a program therefor, and a recording medium having the program stored thereon.

BACKGROUND ART

In the conventional multichannel audio signal coding field, many studies have been made on coding using correlation between stereo signals. One known method is to group five channels, for example, in pairs to render them to coding of stereo signals. Compressive coding is also often used which exploits similarity between channels on the basis of the difference or a fixedly weighted difference signal between the channels. However, most compressive coding techniques provide low compression efficiencies. An example of the technique is disclosed in Non-patent literature 1.

The conventional predictive coding will be described with reference to FIG. 1. As shown in FIG. 1A, at the coding end, a time-series digital signal provided through an input terminal 11 is divided by a frame divider 12 into short-time periods (called frames) consisting of a predetermined number of samples. A linear prediction analyzing section 13 performs linear prediction analysis on each frame of the digital signal to compute prediction coefficients. The prediction coefficients are typically quantized by a quantizing section 13*a* in the linear prediction analyzing section 13.

The quantized prediction coefficients and the digital signal of the frame are inputted into a linear predicting section 14. The linear predicting section 14 performs linear prediction of the digital signal in the time direction to obtain a prediction value of each sample. The linear prediction is autoregressive forward prediction. A subtracting section 15 subtracts the prediction value from the corresponding sample of the input digital signal to generate a prediction error signal. The linear predicting section 14 and the subtracting section 15 constitute a prediction error generating section 16.

The prediction error signal from the prediction error generating section 16 is entropy-coded in a compressive coding section 17 using Huffman coding or arithmetic coding and the result is outputted as an error code. The quantized prediction coefficients from the linear predictive analyzing section 13 are coded in a coefficient coding section 18 using entropy coding or vector quantization and the result is outputted as a coefficient code. The quantized prediction coefficients may be outputted intact as scalar-quantized prediction coefficients.

As shown in FIG. 1B, expansion-decoder 21 at the decoding end decodes an inputted compressed code by using a decoding scheme corresponding to a coding scheme used by the compressive coding section 17 to generate a prediction error signal. A coefficient decoder 22 decodes an inputted coefficient code using a decoding scheme corresponding to a coding scheme used by the coefficient coding section 18 to generate prediction coefficients. The decoded prediction error signal and prediction coefficients are inputted into a predictive synthesizing section 23, where they are predictive-synthesized to reproduce a digital signal. A frame synthesizing section 24 sequentially combines the digital signal of each frame and outputs the combined digital signal to an output terminal 25. In the predictive synthesizing section 23, the digital signal to be reproduced and the decoded prediction coefficients are inputted into a regressive linear prediction section 26, where a prediction value is generated, and the prediction value and the decoded prediction error signal are added together in an adder 27 to reproduce the digital signal.

Non patent literature 1: "An Introduction to Super Audio CD and DVD-Audio", IEEE SIGNAL PROCESSING MAGAZINE, July 2003, pp. 71-82.

DISCLOSURE OF THE INVENTION

Problem to be Solved by the Invention

An object of the present invention is to provide coding and decoding methods, apparatus, program, and a recording medium having the program recorded thereon, capable of coding multichannel (two or more channels) signals, such as audio and medical signals, at a higher compression efficiency than that of the conventional art, on the basis of correlation between channel signals.

Means to Solve Issues

According to the present invention, an input signal of each channel is divided into short-time periods (frames) and at least one channel signal in each frame is independently coded. The other channel signals are difference-coded. One of the channel signals is chosen as a reference signal for the difference coding on the basis of an indicator, such as correlation between channel signals, that relates to the amount of the code, so that the amount of the code is reduced.

Effects of the Invention

According to the present invention, a method for coding channel signals is adaptively chosen for each short-term period (frame) on the basis of an indicator such as correlation between channel signals so that the amount of the code is reduced. As a result, the loading efficiency increases.

BEST MODE FOR CARRYING OUT THE INVENTION

Figure 1A:
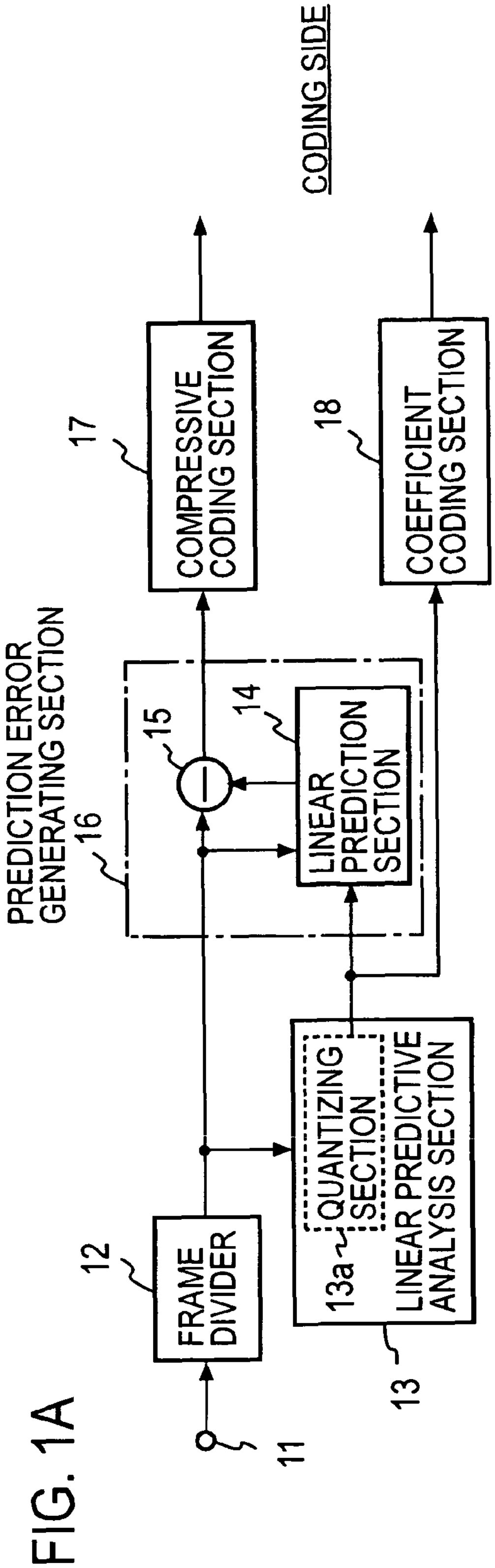
FIG. 1A is a block diagram showing a functional configuration at a coding end in a conventional linear prediction coding method.

Embodiments of the present invention will be described with reference to the accompanying drawings. Throughout the drawings, like elements are labeled like reference numerals to avoid overlapping descriptions.

First Embodiment

Coding

A coding method according to a first embodiment of the present invention determines whether an input signal of each channel should be independently coded or difference-coded, generates signals to be coded from the channel input signals on the basis of the determination, and compression-codes the signals to be coded.

Figure 2:
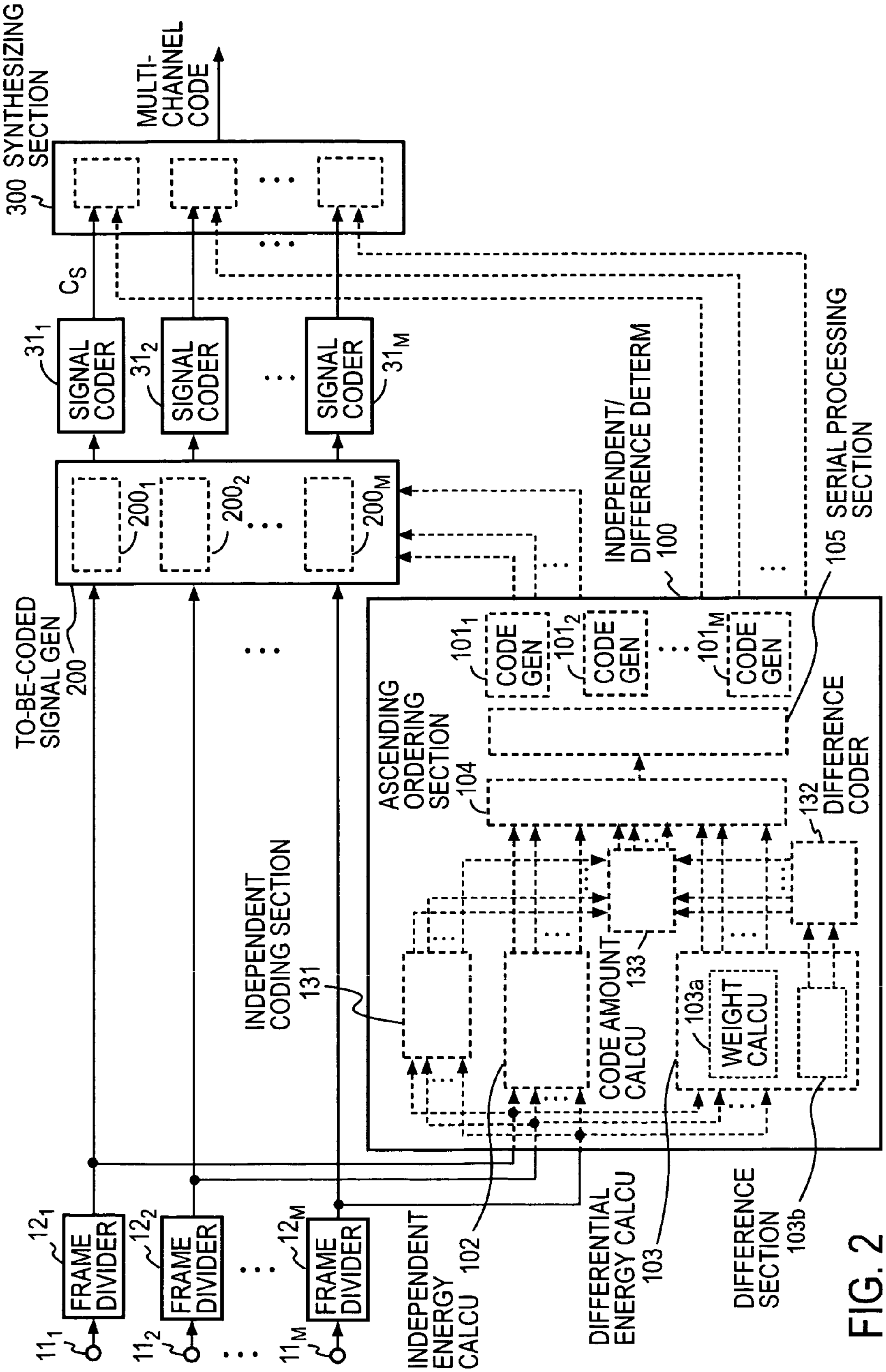
FIG. 2 is a block diagram showing an exemplary functional configuration of a coding apparatus according to a first embodiment of the present invention.

FIG. 2 shows an exemplary functional configuration of a coding apparatus according to the first embodiment of the present invention. Each of input signals of first to M-th channels inputted through input terminals 11$_1$-11$_M$ (sometimes referred to as channel signals) is divided at a frame divider 12$_1$-12$_M$ into short-time periods (frames), each including, for example, 256 samples, 1024 samples, or 8192 samples. In other words, each input signal is divided into sequences, each consisting of, for example, 256, 1024, or 8192 sampled digital values. Here, M is an integer greater than or equal to 2. The first to M-th Channel signals are inputted into an independent/difference determining section 100 frame by frame. The independent/difference determining section 100 determines on the basis of correlation between signals whether each of the channel signals should be independently coded or should be difference-coded using another channel signal as a reference signal. The reference signal used for difference coding is referred to as a master signal (or parent signal) and the channel of the reference signal is referred to as a master channel (or parent channel) herein. The independent/difference determining section 100 also determines a channel identification number of the master channel for difference coding.

Each of the first to M-th channel signals is inputted into a to-be-coded signal generator 200. The to-be-coded signal generator 200 outputs the m-th channel signal (where m=1, . . . , M) as the m-th to-be-coded signal if the independent/difference determining section 100 determines that independent coding should be applied to the m-th channel signal. If the independent/difference determining section 100 determines that difference coding should be applied to the m-th channel signal, the to-be-coded signal generator 200 generates, as the m-th to-be-coded signal, a difference signal between the m-th channel signal and the channel signal of the master channel.

The first to M-th to-be-coded signals are coded into signal codes $C_S$ in signal coding sections 31$_1$-31$_M$, respectively. A code generator 101$_m$ of the independent/difference determining section 100 generates a type code $C_A$ indicating whether the m-th channel signal (m=1, . . . , M), for example, is to be independently coded or difference-coded and, if the signal is to be difference-coded, also generates a reference signal $C_R$ including a code $C_N$ indicating the identification number of its master channel. A synthesizing section 300 combines, for each channel, the signal code $C_S$ with the type code $C_A$ for independent coding; for difference coding, the synthesizing section 300 combines the type code $C_A$ with the reference code $C_R$. The type code $C_A$ may be the identification number of the master channel. In that case, for independent coding, $C_A$ indicates an identification number which is the same as that of the channel to be coded; for difference coding, $C_A$ indicates an identification number (the identification number of the master channel) different from that of the channel to be coded. Alternatively, a code $C_N$ indicating the identification number of the master channel may be generated for all channels. In that case also, for independent coding, $C_N$ indicates a number which is the same as the identification number of the channel to be coded; for difference coding, $C_N$ indicates an identification number (the identification number of the master channel) which is different from that of the channel to be coded. The signals thus coded in frames are outputted as a multichannel code.

Determination of Independent or Difference Coding

Figure 3:
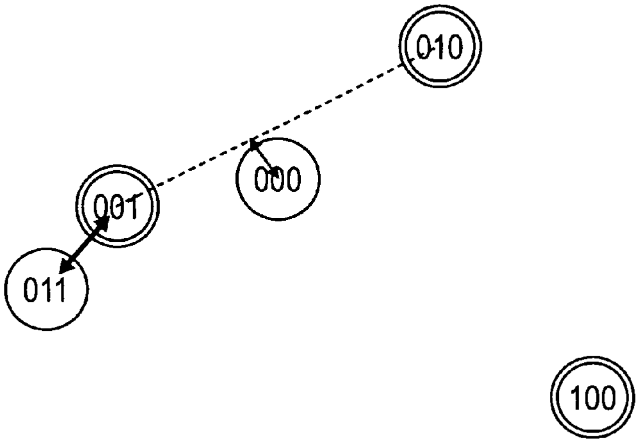
FIG. 3 is a diagram illustrating the distance (correlation) between channel signals and a coding method.

The independent/difference determining section 100 determines, on the basis of correlation between signals, whether the m-th channel signal should be independently coded or difference-coded. The concept of the determination will be described with reference to FIG. 3. The center of each circle in FIG. 3 represents a channel signal vector of a channel (a vector whose elements are the samples in a frame. The vector will be simply referred to as a "channel signal"). The binary number in each circle represents the channel identification number m. A double circle indicates that independent coding is used. The channel signal of m=011 is strongly correlated with the channel signal of m=001 which has been determined to be independently coded. That is, channel signal of m=011 is closest to channel signal of m=001 among the other channel signals. Accordingly, it is determined that for the m=001-th channel, the difference vector from channel signal of m=011 is coded (difference coding). For the m=000-th channel, the difference from the interior division vector between channel signal of m=001 and channel signal of m=010 is coded.

Figure 4:
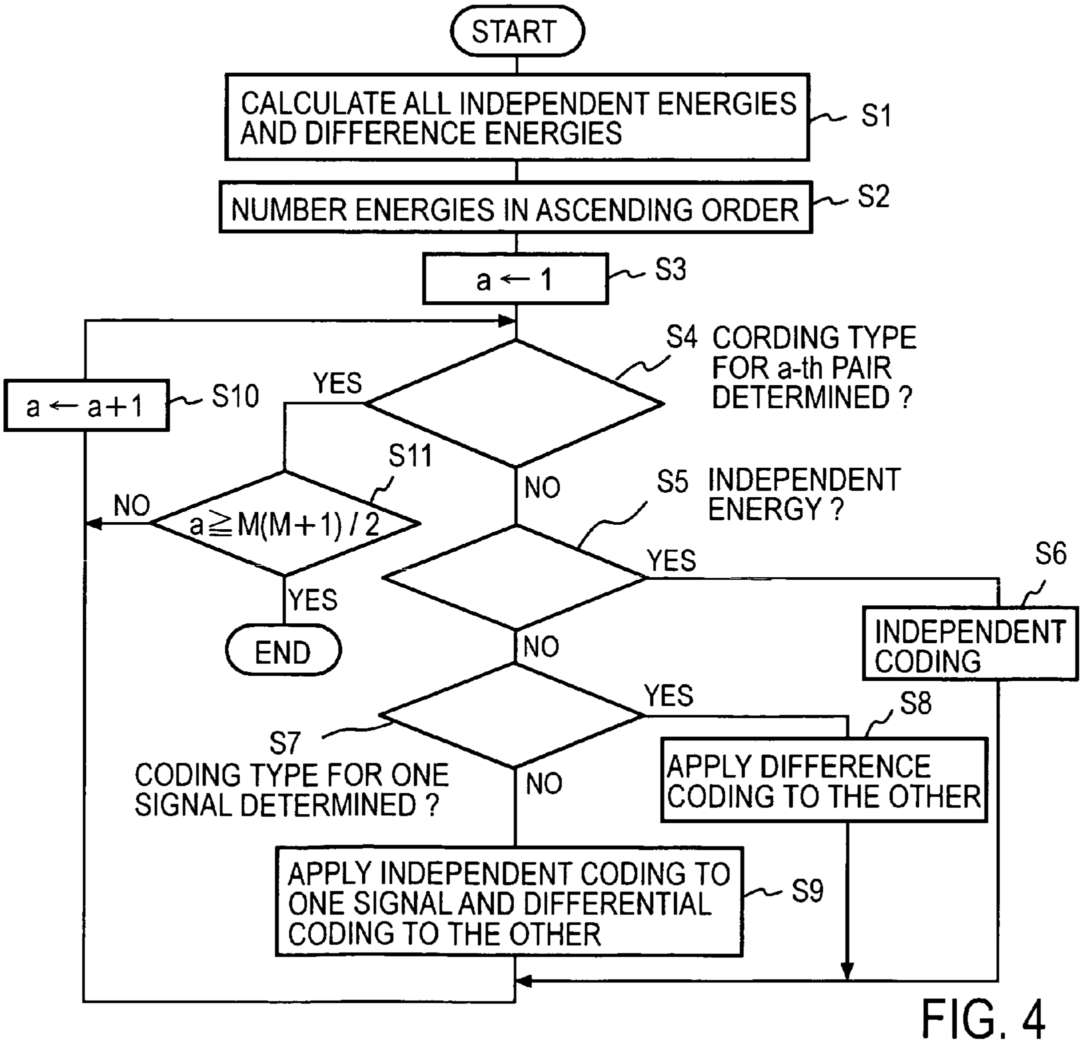
FIG. 4 is a flowchart of an exemplary process for determining whether a channel signal should be independently coded or should be difference-coded with another channel signal.

Whether independent coding or difference coding is to be used can be determined in various ways. One example will be described with reference to the functional configuration shown at the independent/difference determining section 100 in FIG. 2 and a flowchart of the process shown in FIG. 4. First, an independent energy calculating section 102 and a difference energy calculating section 103 calculate the energy of each of the m-th channel signals themselves and the energy of difference signals between each of the m-th channel signals and every other channel signal, respectively (step S1). An ascending ordering section 104 assigns numbers "a" to M (M+1)/2 energy values in ascending order of energy value, that is, in descending order of the degree of correlation between signals (step S2). Then, the processing parameter "a" is initialized to 1 (step S3). Decision is made as to whether the types of coding (independent coding or difference coding) for both of the two channel signals that correspond to the a-th smallest energy have been determined (as to whether a flag has been set) (step S4). Here, for the energy of the difference vector, the two channel signals are those whose difference therebetween has been calculated. For the energy of the channel signals themselves, the two channel signals are those represented by the identification numbers of the channel signals (in fact, the two channel signals are one identical channel signal). If the type of coding of neither of the two channel signals has been determined, decision is made as to whether the a-th energy is independent energy (step S5). Whether an energy is independent or not can be decided by examining whether the two channel signals are the same or not. If it is decided at step S5 that the energy is independent, independent coding is chosen for the channel signals (a flag is set) (step S6). That is, if the sum of squares of the channel signals themselves (weighted vector energy) is smaller than the sum of squares of difference signals from any other channel signals, independent coding is chosen for the channel signals. If it is determined at step S5 that the a-th energy is not independent, it is difference. Therefore, determination is made as to whether the type of coding of one of the channel signal has been determined (whether a flag is set) (step S7). If the type of coding of one of the channel signals has been determined, it is determined that difference coding is to be applied to the other channel signal which has not been determined by using the channel signal which has been determined as the master channel, and then the identification number of the master channel is recorded (step S8). If it is determined at step S7 that the type of coding of neither of the two channels has been determined, it is determined that one of the two channel signals is to be independently coded (a flag is set) and is to be used as the master channel for difference coding of the other channel signal (it is flagged as such), and then the identification number of the master channel is recorded (step S9). After steps S6, S8, and S9, the parameter "a" is incremented by 1 (step S10) and then the process returns to step S4. If it is decided at step S4 that the type of coding of both channel signals has been determined (the flag is set), the process returns to step S11, where decision is made as to whether the parameter "a" is greater than or equal to M(M+1)/2. If No, the process proceeds to step S11; otherwise the process will end. Here, M denotes the number of input channels. The process described so far is performed by a serial processing section 105 of the independent/difference determining section 100.

Generation of To-Be-Coded Signal

Figure 5:
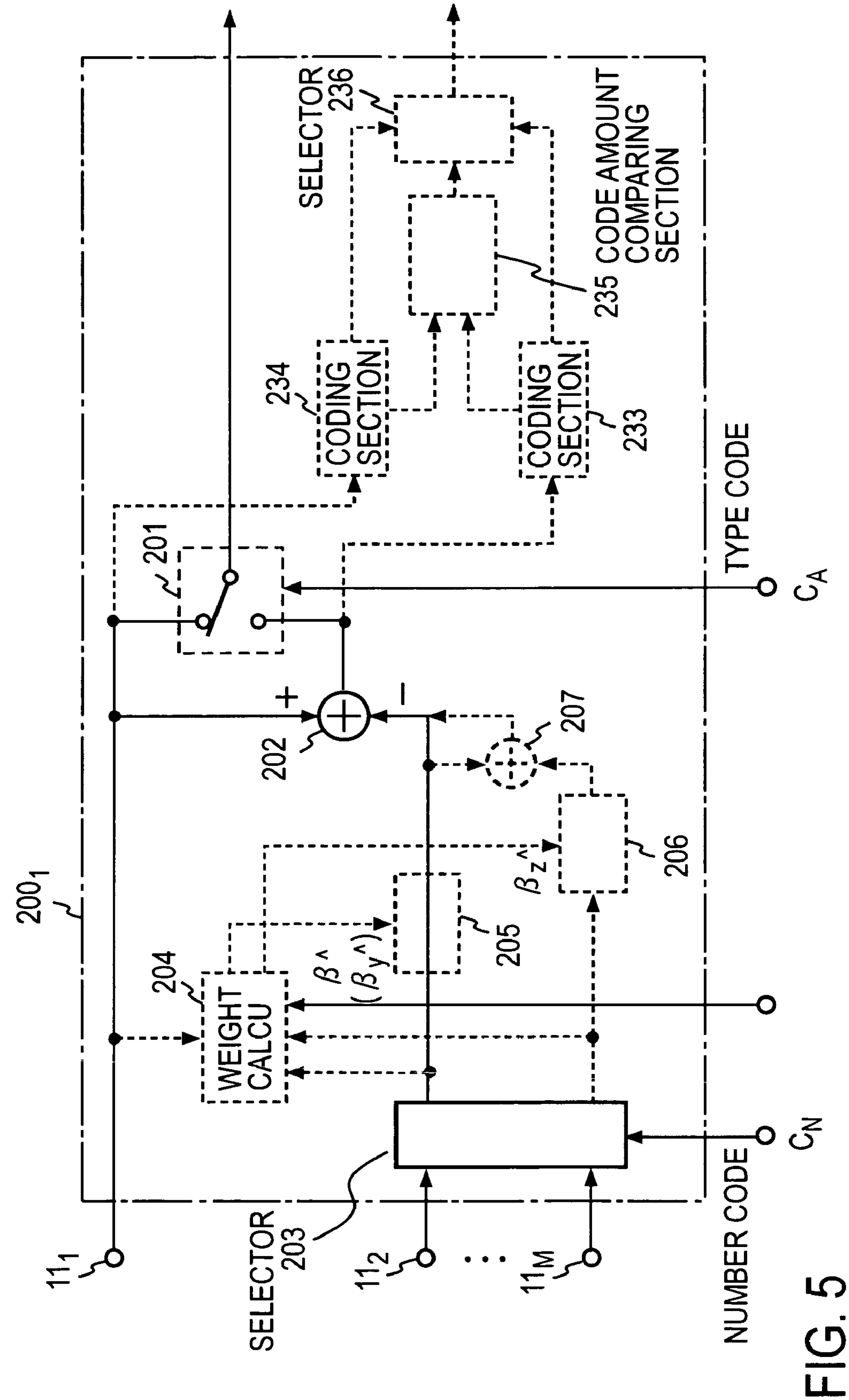
FIG. 5 is a block diagram showing an exemplary functional configuration of a to-be-coded signal generator 200 shown in FIG. 2 for a first channel.

The to-be-coded signal generator 200 in FIG. 2 generates, for each of the channel signals, a to-be-coded signal for the m-th channel in accordance with determination made by the independent/difference determining section 100. FIG. 5 shows a functional configuration of a processing section $\mathbf{200}_1$ for the first channel signal. If the input type code $C_A$ representing the determination indicates independent coding, a selector switch 201 is switched to an input terminal $\mathbf{11}_1$ of that channel signal and the first channel signal is provided through the input terminal $\mathbf{11}_1$ as the to-be-coded signal.

If the inputted type code $C_A$ indicates difference coding, the selector switch 201 is turned to the output of a difference circuit 202. Reference code $C_R$ is also inputted in this case and its number code $C_N$ is inputted in a selector 203 as a control code. Inputted in the selector 203 are channel signals (the second to M-th channel signals) from all input terminals other than the first input terminal $\mathbf{10}_1$ (the second to M-th input terminals). The selector 203 selects a channel signal from an appropriate input terminal based on the number code $C_N$ and provides it to the difference circuit 202. Also provided to the difference circuit 202 is an input signal from the channel of interest, namely the first channel in this example. The channel signal of the master channel selected at the selector 203 is subtracted from the first channel signal and the resultant difference signal is outputted as the first to-be-coded signal.

Figures 6A, 6B, 6C, 6D:
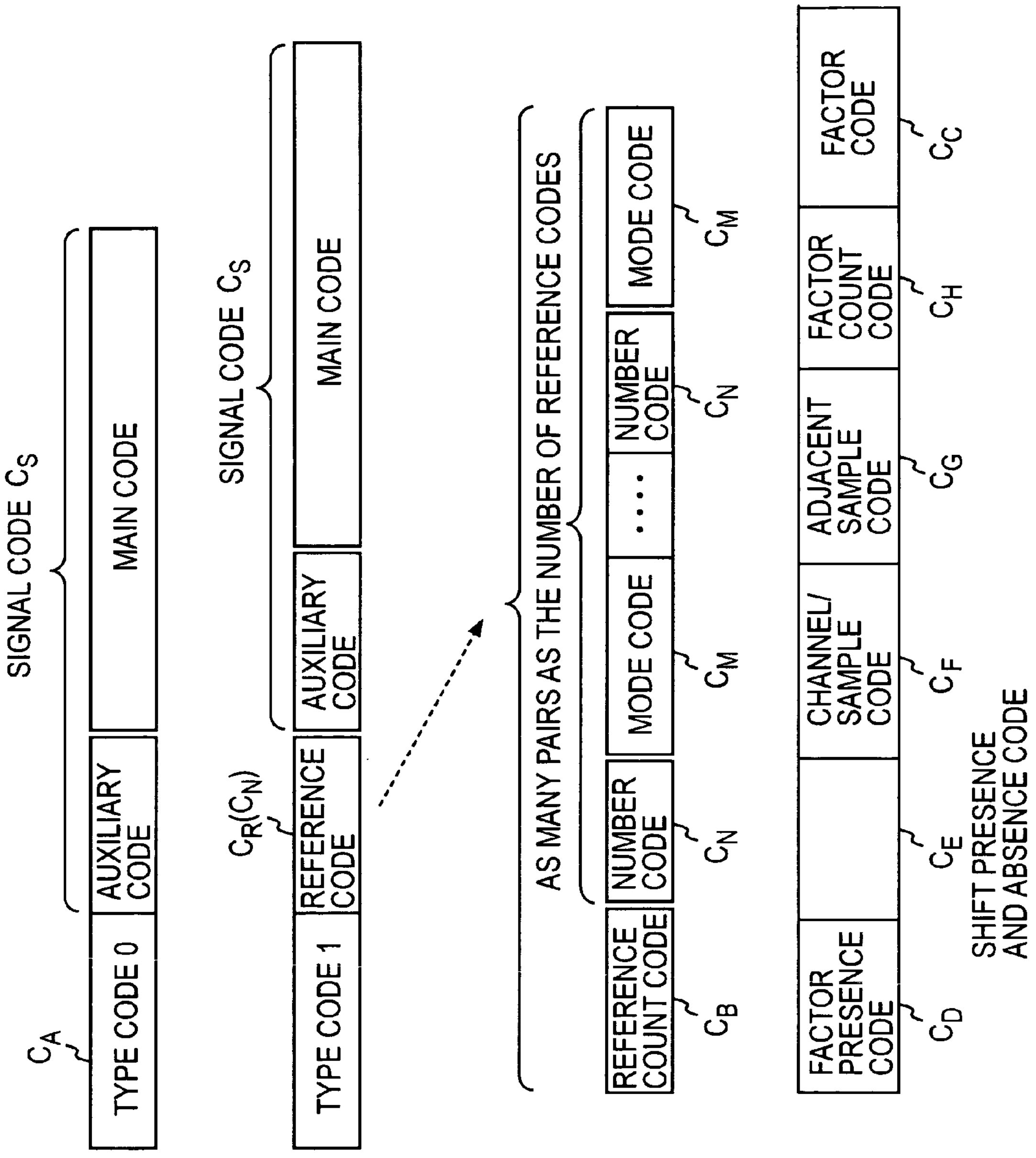
FIG. 6A shows an exemplary channel code generated by independent coding.
FIG. 6B shows an exemplary channel code generated by difference coding.
FIG. 6C shows an exemplary reference code $C_R$.
FIG. 6D shows an exemplary mode code $C_M$.

The m-th to-be-coded signal is coded at a signal coder $\mathbf{31}_m$. The predictive coding scheme shown in FIG. 1A, for example, can be used in the signal coder $\mathbf{31}_m$. In this case, a signal code is made up of a main code preferably generated by applying lossless compression to a prediction error signal and an auxiliary code generated by coding prediction coefficients. Accordingly, in the case of independent coding, the code of each channel in a multichannel code outputted from the synthesizing section 300 in FIG. 2 consists of a type code $C_A$, "0", for example, and a signal code $C_S$ (which consists of an auxiliary code and a main code) as shown in FIG. 6A. In the case of difference coding, a channel code consists of a type code, "1", for example, a reference code $C_R$, and a signal code $C_S$ (an auxiliary code and a main code) as shown in FIG. 6B. The reference code $C_R$ includes a number code $C_N$. In the example shown in FIG. 6B, $C_R$=$C_N$. The codes may be any codes that indicate which of independent coding and difference coding is used to encode the channel signals and, if difference coding is used, also indicates the identification number of the master channel.

Weighted Difference

A difference signal used for calculating the difference energy in the independent/difference determining section 100 in FIG. 2 and the difference signal generated by the difference circuit 202 in FIG. 5 may be weighted difference signals. Weighted differences reduce the amount of the code. Examples of methods for obtaining a weighted difference will be described below.

Method in which one weighting factor is used (where one master channel is used)

If a channel signal Y (y(0), . . . , y(N−1)) is used as the reference signal for a channel signal X (x(0), . . . , x(N−1), a weighting factor β is calculated such that the energy of the weighted difference signal (vector)

$$d=\|X-\beta Y\|^2 \tag{1}$$

is minimized, thereby minimizing the amount of the code. This can be obtained as $$\beta=Y^TX/Y^TY \tag{2}$$

$Y^TX$ is an inner product which can be obtained by

[Formula 1]

$$Y^TX=\sum_{i=0}^{N-1}y(i)x(i) \tag{3}$$

$$Y^TY=\sum_{i=0}^{N-1}y(i)^2$$

where N is the number of samples in a frame (i=0 to N−1).

Figure 7A:
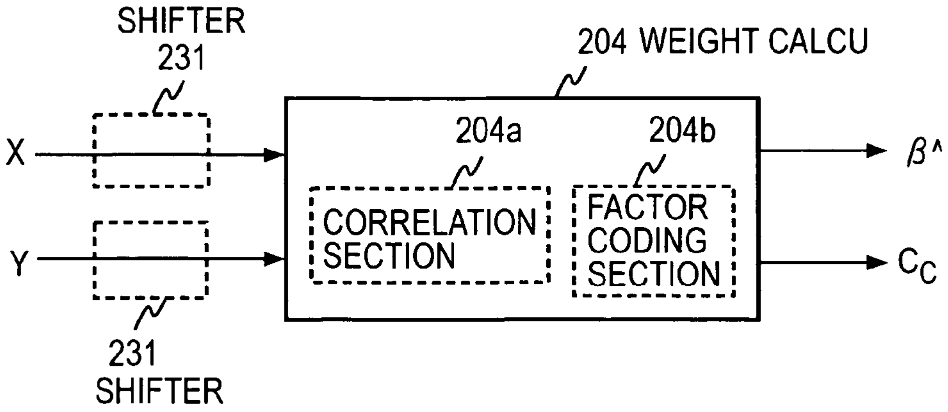
FIG. 7A shows an exemplary functional configuration of a weighting factor calculating section for the case where there is one master channel.

That is, vectors X and Y are inputted in a weight calculating section 204, and a correlation section 204*a* of the weight calculating section 204 calculates Equation (2) as shown in FIG. 7A. The result of the calculation is quantized at a factor coding section 204*b*, which outputs a quantized weighting factor β^ and a factor code $C_C$, which is a code of the quantized weighting factor. As shown in FIG. 5, a multiplier 205 multiples the reference signal selected by the selector 203 by the quantized weighting factor β^ calculated at the weight calculating section 204. The product is provided to the difference circuit 202. The independent/difference determining section 100 determines which of independent coding and difference coding should be applied to each of the channel signals, according to the method shown in FIG. 4. Before calculating the difference signal energy, the independent/difference determining section 100 obtains the weighted difference signal. In particular, a process as shown in FIG. 7A is performed in a weight calculating section 103*a* in the difference energy calculating section 103 in the independent/difference determining section 100 in FIG. 2, the obtained quantized weighting factor β^ is used to generate a weighted difference signal between two channel signals in a difference section 103*b*, and the energy of the weighted difference signal is calculated. The weighted difference signal thus obtained may be stored in a buffer and then provided as a to-be-coded signal for the corresponding channel generated in the to-be-coded signal generator 200 in FIG. 2. Alternatively, the obtained quantized weighting factor β^ may be provided to a processing section provided in the to-be-coded signal generator 200 for the corresponding channel. The factor code $C_C$ obtained in the factor coding section 204*b*, in other words, the factor code $C_C$ obtained in the weight calculating section 103*a* is inputted in the code generator $\mathbf{101}_m$ for the corresponding channel in the independent/difference determining section 100 shown in FIG. 2, and is included in the reference code $C_R$. The same applies to a weighted difference method described below.

Method in which Multiple Master Channels are Used

An example of a method for calculating the difference between the weighted average of channel signals of multiple master channels and a channel signal of interest will be described with reference to a case where two reference signals are used. Channel signals of master channels are denoted by Y (y(0), . . . , y(N−1)) and Z (z(0), . . . , z(N−1)) and weighting factors for these signals are denoted by $\beta_y$ and $\beta_z$. A difference vector E between X and the combination of Y and Z is obtained, thereby minimizing the amount of the code required for the entire vector of X. The amount of the code is strongly correlated with the energies of vectors. Therefore, the energy of the difference vector $d=\|E\|^2$ is minimized.

$$E=X-\beta_yY-\beta_zZ \tag{4}$$

Here, $\beta_y$ and $\beta_z$ are determined for each frame and are quantized before transmission. The weighting factors $\beta_y$ and $\beta_z$ can be determined separately or simultaneously.

If they are to be determined separately, the coefficient of correlation between X and Y is calculated by using Equations (2) and (3), the resultant correlation coefficient is quantized, and the correlation coefficient between X−$\beta_y$^Y and Z is obtained using the quantized $\beta_y$^ in the same way.

If they are to be determined simultaneously, the following is used.

[Formula 2]

$$\begin{bmatrix}\beta_y\\ \beta_z\end{bmatrix}=\begin{bmatrix}Y^TY & Y^TZ\\ Y^TZ & Z^TZ\end{bmatrix}^{-1}\begin{bmatrix}X^TY\\ X^TZ\end{bmatrix} \tag{5}$$

Figure 7B:
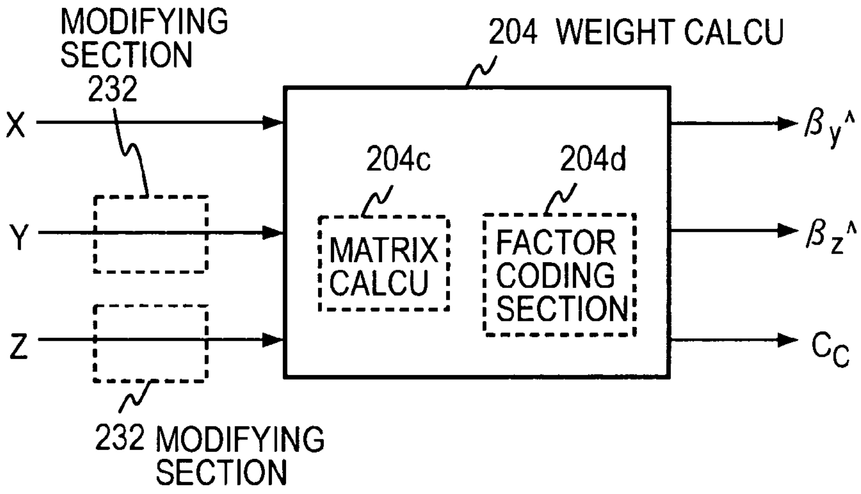
FIG. 7B shows another exemplary configuration of the weighting factor calculating section for the case where there are two master channels.

The weighting factors $\beta_y$ and $\beta_z$ calculated are approximations. In practice, quantized values approximating to the values of the weighting factors are used and factor codes $C_C$ specifying those values are outputted. For example, as shown in FIG. 7B, a matrix calculating section 204*c* calculates Equation (5), and a factor coding section 204*d* obtains quantized weighting factors $\beta_y$^ and $\beta_z$^ and obtains and outputs their factor codes $C_C$.

In the to-be-coded signal generator 200, two reference signals Y and Z are selected at the selector 203 as shown in FIG. 5, for example. They are multiplied by the quantized weighting factors $\beta_y$^ and $\beta_z$^ at the multipliers 205 and 206, and the products are added together at the adder 207 and the result is provided to the difference circuit 202.

The weighting factors $\beta_y$ and $\beta_z$ obtained as described above minimize the energy of the difference vector. However, the minimized value does not necessarily match the minimized value resulting from coding of the difference vector. Therefore, multiple quantization tables may be used to calculate difference vectors E of multiple pairs of quantized weighting factors $\beta_y$^ and $\beta_z$^ according to Equation (4), then the difference vectors E may be compression-coded, the amounts of the resulting codes may be examined, and the pairs of $\beta_y$^ and $\beta_z$^ that have the smallest code amount may be selected.

Example where Weighted Average of Adjacent Samples are Used

In the methods described above, samples obtained at the same point in time are used to obtain correlation between a channel of interest and a master channel. However, the weighted difference may be obtained by using correlation with at least one of two adjacent samples of the master channel, in addition to correlation between the samples at the same point in time. For example, to take into consideration the adjacent samples on both sides of a sample, the weighting factor for samples taken at the same point in time is denoted by $\gamma_0$, the weighting factor for the preceding sample is denoted by $\gamma_{-1}$, and the weighting factor for the succeeding sample is denoted by $\gamma_1$. In this case, $\gamma_{-1}$, $\gamma_0$, and $\gamma_1$ that minimize the difference energy calculated with Equation (6) can be calculated.

[Formula 3]

$$d=\sum_{i=0}^{N-2}\left(x-\sum_{j=-1}^{1}(\gamma_j y(i-j))\right)^2 \tag{6}$$

where $\gamma_{-1}$, $\gamma_0$, and $\gamma_1$ can be obtained by the matrix calculation according to Equation (7).

[Formula 4]

$$\begin{bmatrix}\gamma_{-1}\\ \gamma_0\\ \gamma_1\end{bmatrix}=\begin{bmatrix}Y_{-1}^TY_{-1} & Y_{-1}^TY_0 & Y_{-1}^TY_1\\ Y_0^TY_{-1} & Y_0^TY_0 & Y_0^TY_1\\ Y_1^TY_{-1} & Y_1^TY_0 & Y_1^TY_1\end{bmatrix}^{-1}\begin{bmatrix}Y_{-1}^TX_0\\ Y_0^TX_0\\ Y_1^TX_0\end{bmatrix} \tag{7}$$

Figure 8:
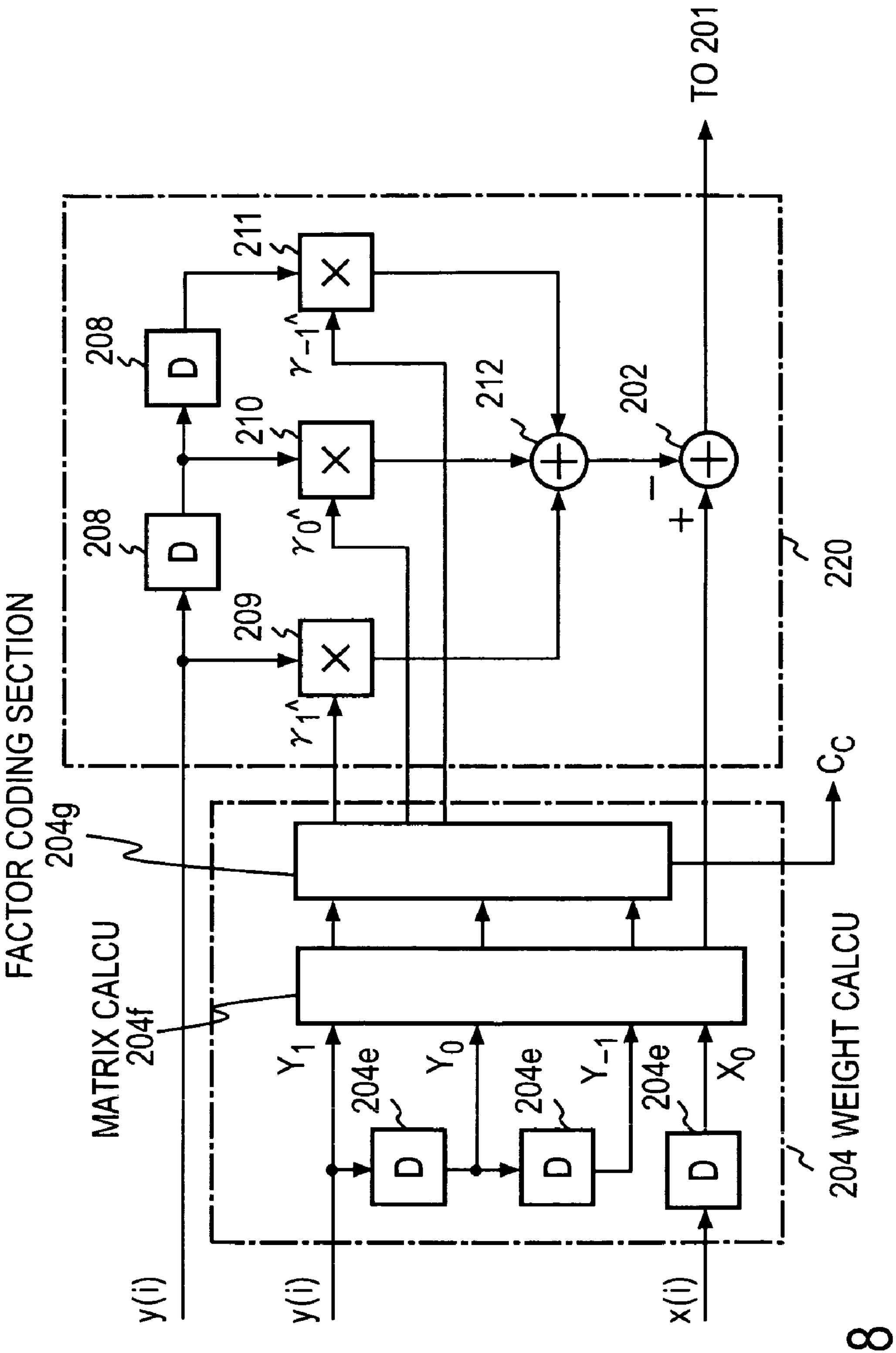
FIG. 8 is a functional configuration diagram showing a weighting function calculating section and a difference signal generator for the case where a weighted difference between adjacent samples is used.

As shown in FIG. 8, the master channel signal y(i) is directly provided to the matrix calculating section 204*f* as vector $Y_{-1}$. The master channel signal y(i) is delayed by one sample by a unit delay section 204*e* and is delayed by one additional sample, and the delayed signals are provided to the matrix calculating section 204*f* as vectors $Y_0$ and $Y_1$, respectively. A channel signal of interest x(i) is delayed by one sample and provided to the matrix calculating section 204*f* as vector $X_0$. Equation (7) is calculated in the matrix calculating section 204*f* and the result of the calculation is quantized in a factor coding section 204*g*. As a result, quantized weighting factors $\gamma_{-1}\hat{}$, $\gamma_0\hat{}$, and $\gamma_1\hat{}$ and factor codes $C_C$ are outputted.

In a weighted difference generator 220, the reference signal y(i) is directly provided to a multiplier 209. The reference signal y(i) is delayed by one sample at the unit delay section 208 and provided to another multiplier 210, and further delayed by one sample and provided to a multiplier 211. The multipliers 209, 210, and 211 multiply the signal by the quantized weighting factors $\gamma_{-1}\hat{}$, $\gamma_0\hat{}$, and $\gamma_1\hat{}$. An adder 212 adds the products together. The difference circuit 202 subtracts the weighted average signal of the three samples from the channel signal of interest delayed by one sample and outputs the result as a weighted difference signal.

The weighted average of multiple samples of multiple reference signals may be used. For example, if reference signals y(i) and z(i) are used and the samples which are a preceding sample and a succeeding sample are included, the difference signal e(i) represented by Equation (8) is obtained and weighting factors $\gamma_{-1}$, $\gamma_0$, and $\gamma_1$ are determined such that the energy of the difference signal e(i) is minimized.

[Formula 5]

$$e(i)=x(i)-\sum_{j=-1}^{1}(\gamma_j y(i-j))-\sum_{j=-1}^{1}(\gamma_j z(i-j)) \tag{8}$$

Example where a weighting factor is made dependent on sample sequence positions

In the methods described above, fixed weighing factors of weighted differences are used in a frame. However, a weighting factor that depends on the position (number) of a sample in a frame may be used. For example, functions f(i), g(i) may be used.

$$f(i)+g(i)=1, i=1, \ldots, N-1 \tag{9}$$

where $$f(i)=(1-i(1/N)) \tag{10}$$

$$g(i)=i(1/N)$$

Figure 9A:
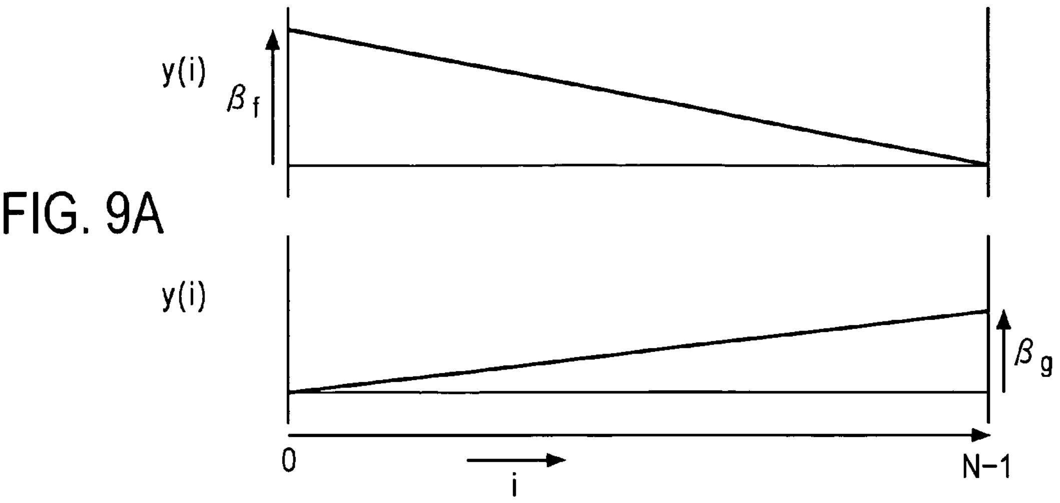
FIG. 9A shows an exemplary weighting function in which the weight varies depending on the positions of samples in a frame.

Weighting factors associated with these are denoted by $\beta_f$ and $\beta_g$. That is, the weighting factor for the first sample (i=0) in a frame is $\beta_f$ and the weighing factor for the last sample (i=N−1) in the frame is $\beta_g$ as shown in FIG. 9A. The i-th weighted difference sample between a channel signal of interest x(i) and a master channel signal y(i) is obtained according to Equation (11).

$$d(i)=x(i)-(\beta_f f(i)y(i)+\beta_g g(i)y(i)), i=0, \ldots, N-1 \tag{11}$$

As shown in the following equations (12) and (13), f(i)y(i) and g(i)y(i) are substituted by u(i) and v(i), respectively.

$$u(i)=f(i)y(i) \tag{12}$$

$$v(i)=g(i)y(i) \tag{13}$$

Thus, Equation (11) becomes similar to Equation (4). Therefore, $\beta_f$ and $\beta_g$ can be obtained in the same way as $\beta_y$ and $\beta_z$ in Equation (5) were obtained.

Figure 7C:
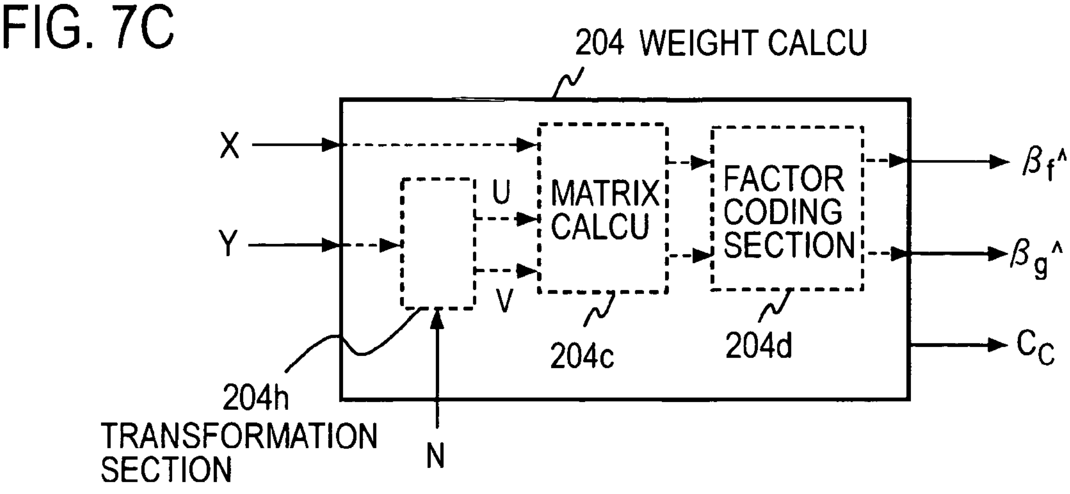
FIG. 7C shows another exemplary configuration of the weighting factor calculating section for the case where a weighting factor is made dependent on the position of a sample sequence.

For example, a channel signal of interest X and a master channel signal Y are inputted into the weight calculating section 204 as shown in FIG. 7C. A transforming section 204*h* applies transformations represented by Equations (12) and (13) to the master channel signal Y to generate vectors U and V. The matrix calculating section 204*c* calculates weighting factors $\beta_i$ and $\beta_g$ such that the energy of the weighted difference vector between the weighted average of vectors U and V and the channel signal of interest X is minimized. The factor coding section 204*d* quantizes $\beta_f$ and $\beta_g$ obtained and outputs quantized weighting factors $\beta_f\hat{}$ and $\beta_g\hat{}$ and factor codes $C_C$.

Figure 10:
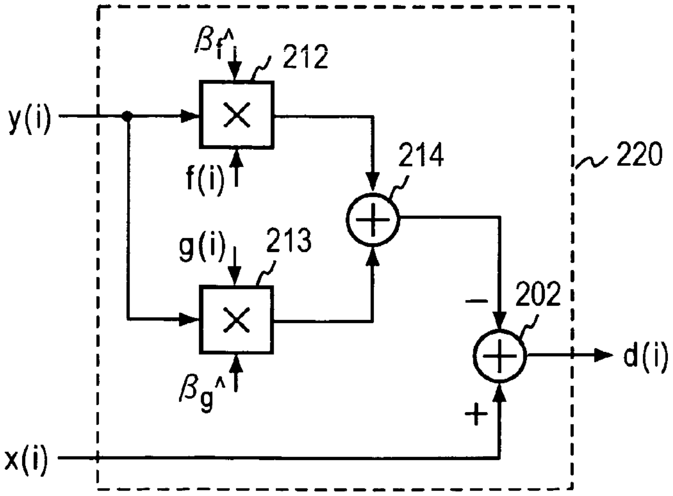
FIG. 10 shows an exemplary functional configuration of the difference signal generator for the case where a single channel signal is used as a reference signal and the weight varies depending on the positions of samples in a frame.

The multiplier 212 of the weighted difference generator 220 shown in FIG. 10 multiplies the channel signal y(i) of the master channel by the quantized weighting factor $\beta_f\hat{}$ and the function f(i). The multiplier 213 multiples the master channel signal y(i) by the quantized weighting factor $\beta_g\hat{}$ and the function g(i). The products are added together at the adder 214. The difference circuit 202 subtracts the sum obtained at the adder 214 from the channel signal of interest x(i).

Figure 9B:
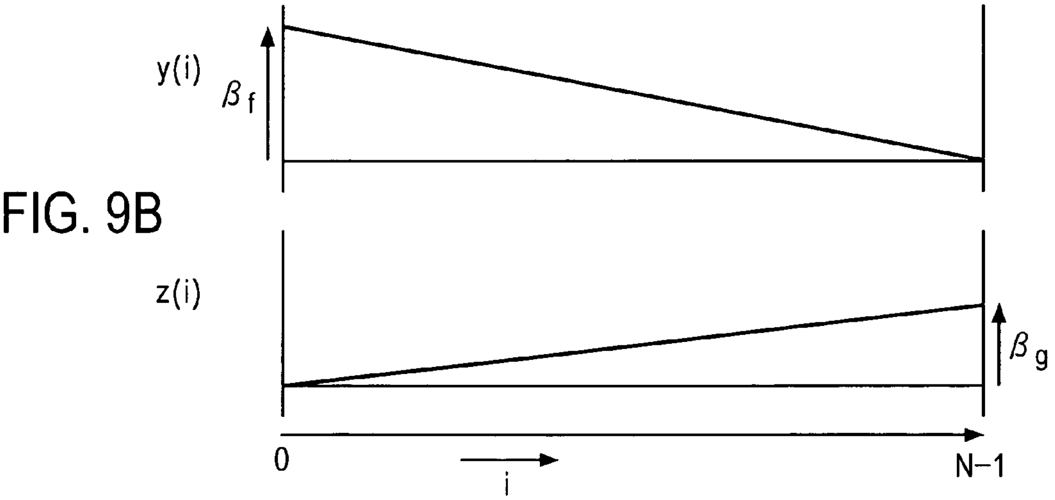
FIG. 9B shows an exemplary weighting function in which the weight varies depending on the positions of samples in a frame with respect to a channel signal in a different master channel.

Weighting factors dependent on the positions of samples (sample numbers) may be used for multiple reference signals. For example, for the first sample in a frame, a weight of $\beta_f$ is used for a first master channel signal y(i) and a weight of 0 is used for a second master channel signal z(i) as shown in FIG. 9B. At the end of the frame, a weight of 0 is used for the channel signal y(i) of the first master channel and a weight of $\beta_g$ is used for the channel signal z(i) of the second master channel. The weights gradually change with sample position in the frame. In particular, the i-th weighted difference sample is obtained according to Equation (14):

$$d(i)=x(i)-(\beta_f f(i)y(i)+\beta_g g(i)z(i)) \tag{14}$$

Example where Multiple Factors are Repeatedly Used

Multiple weighting factors may be repeatedly used in order in accordance with positions (numbers) of samples. That is, samples of a channel signal of interest and a reference signal are allocated to a number q of series (where q is an integer greater than or equal to 2), one by one in sequence. Then, weighted difference signals may be generated between corresponding ones of q channel signals of interest and q reference signals into which the two signals respectively are divided, and the weighted difference signals may be integrated into one sample sequence. In other words, samples in the time direction may be dealt out to the multiple series and multiple factors may be used for them.

Figure 11:
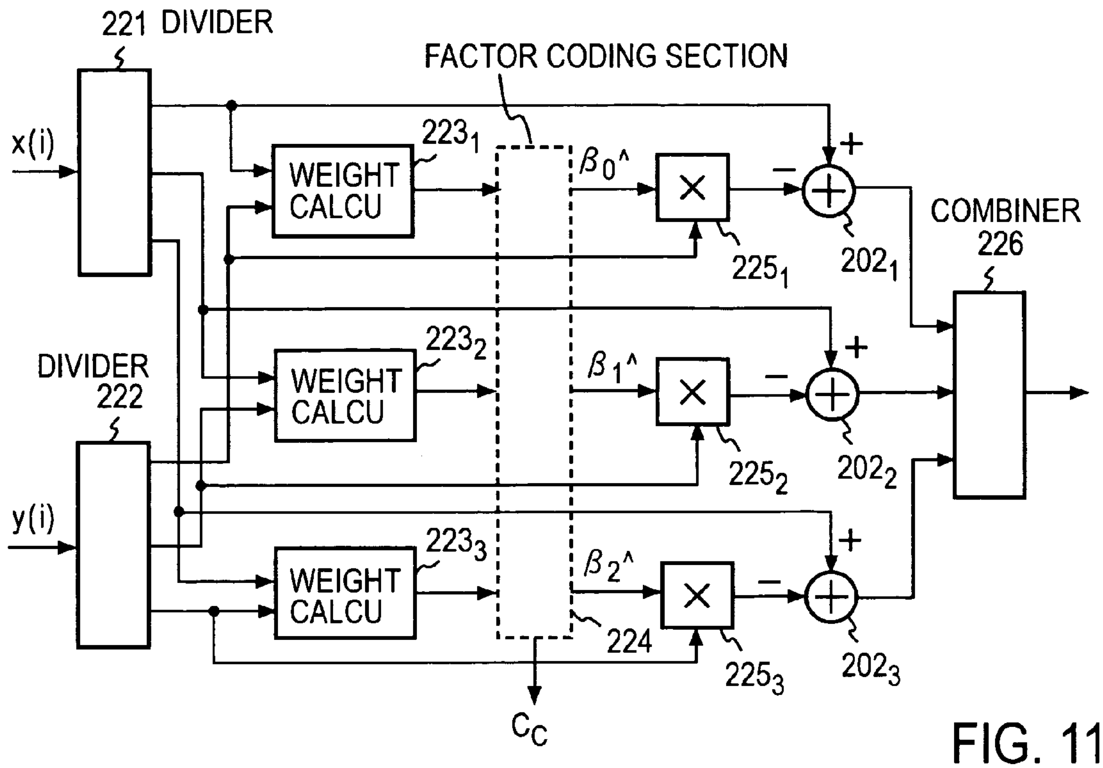
FIG. 11 shows an exemplary functional configuration of a difference signal generator which sorts samples of a single-channel signal in accordance with the positions of the samples.

For example, samples of a channel signal of interest x(i) and a master channel signal y(i) are allocated by the dividers 221 and 222, respectively, to three series as shown in FIG. 11. That is, the signals are divided and provided to first to third separate series. Each of corresponding pairs of the first to third separate series of the channel signal of interest x(i) and the first to third series of the master channel signal y(i) are inputted into the weight calculating sections 223$_1$-223$_3$, where weighting factors $\beta_0$-$\beta_2$, respectively, are calculated. The weighting factors may be calculated in the same way as described with reference to FIG. 7A. The calculated weighting factors $\beta_0$-$\beta_2$ are quantized and coded in a factor coding section 224 and quantized weighting factors $\beta_0$^-$\beta_2$^ and factor codes $C_C$ are outputted.

The first to third separate series of the reference signal are multiplied by these quantized weighting factors $\beta_0$^-$\beta_2$^ in multipliers 225$_1$-225$_3$, respectively. The first to third separate reference signal series multiplied by the factors are subtracted from the first to third separate series of the channel signal of interest, respectively, in difference circuits 202$_1$-202$_3$. The differences obtained by the subtractions are combined in the combiner 226 sample by sample, and weighted difference signals are outputted. The output signals from the difference circuits 202$_1$-202$_3$ are as the following equation (15):

$$d(i)=x(i)-\beta_0\hat{}y(i) \text{ for mod } (i,3)=0 \quad (15)$$

$$d(i)=x(i)-\beta_1\hat{}y(i) \text{ for mod } (i,3)=1,$$

$$d(i)=x(i)-\beta_2\hat{}(i) \text{ for mod } (i,3)=2,$$

where mode (i,j) represents the remainder of i divided by j.

Figure 12:
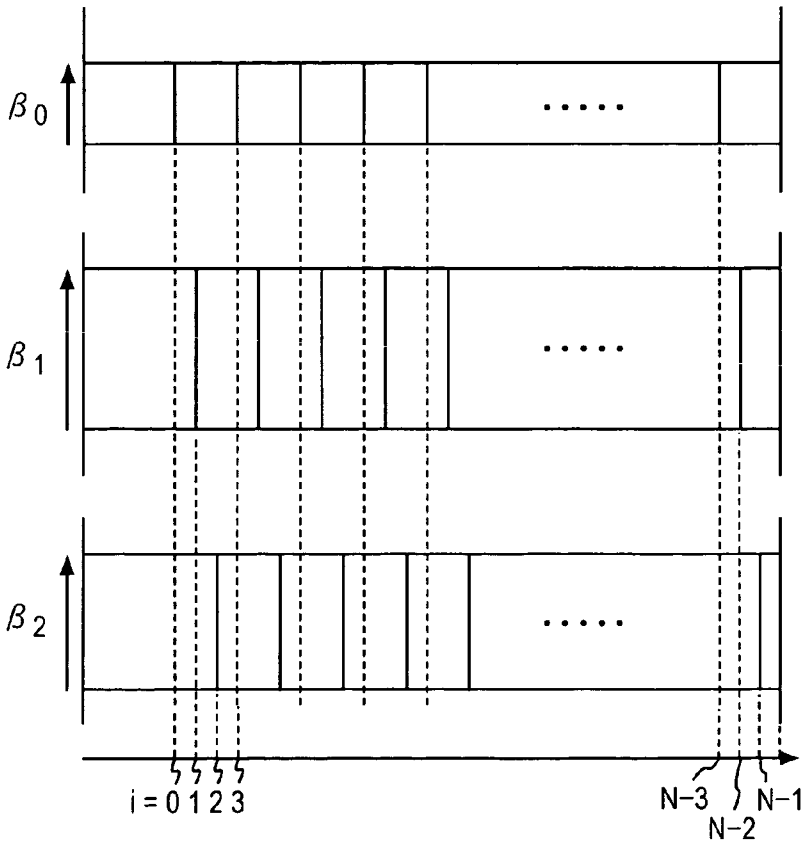
FIG. 12 shows an example of sorting of samples and weighting functions.

By increasing the number of weighting factors used in one frame in this way, the degree of the correlation can be increased accordingly. In other words, the energies of weighted difference signals can be decreased and the amount of the codes can be reduced accordingly. However, the information amount of factor code $C_C$ increases. The weighting factors $\beta_0$-$\beta_2$ for the first to third separate series of the master channel signal y(i) will be as shown in FIG. 12, for example.

Figure 13:
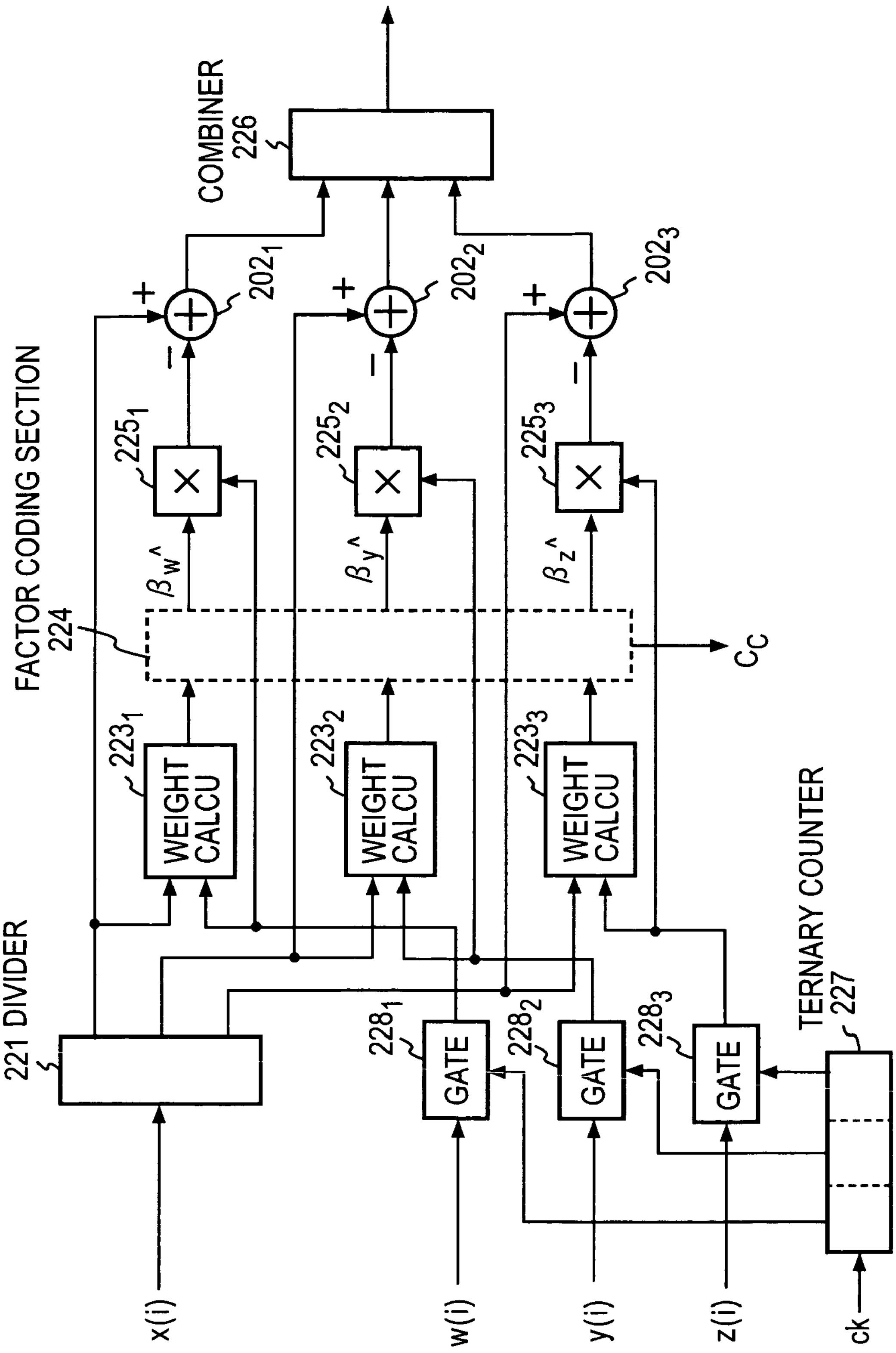
FIG. 13 shows an exemplary functional configuration of a difference signal generator which classifies multiple channels as master channel according to the positions of samples.

The channel signal of interest may be allocated to multiple series to generate multiple separate series and weighted difference samples between each separate series and samples of channel signals of different master channels may be generated. For example, a divider 221 divides a channel signal of interest x(i) into three series (q=3), first to third separate series, as shown in FIG. 13. A sample clock ck generated for each sample in a frame is inputted into a ternary (q=3) counter 227 and outputs from the three counting stages (q=3) of the counter 227 control gates 228$_1$, 228$_2$, and 228$_3$. This control causes three (q=3) reference signals w(i), y(i), and z(i) to be shifted by one sample from one another. Samples are extracted sequentially every three (q=3) samples.

The three (q=3) series sequentially extracted by shifting by one sample and the first to third separate series of x(i) are inputted in weight calculating sections 223$_1$-223$_3$, where weighting factors $\beta_w$, $\beta_y$, and $\beta_z$ are calculated based on correlations between corresponding series. Each of the weighting factors $\beta_w$, $\beta_y$, and $\beta_z$ is quantized in a factor coding section 224 and quantized weighting factors $\beta_w$^, $\beta_y$^, and $\beta_z$^ and factor codes $C_C$ are outputted. Multipliers 225$_1$-225$_3$ multiplies the channel signals w(i), y(i), and z(i) gated at gates 228$_1$-228$_3$ by the quantized weighing factors $\beta_w$^, $\beta_y$^, and $\beta_z$^. Difference circuits 202$_1$-202$_3$ subtract the products from the first to third separate series of the channel signal of interest x(i). The differences are combined in a combiner 226 in order of sample number and outputted as weighted difference signals.

[Channel Code]

As shown in FIGS. 6A and 6B, a channel code including a type code $C_A$ and a signal code $C_S$ or a channel code including a code $C_R$ that contains the channel identification number of a master channel, and a signal code $C_S$, for example, is obtained for each channel signal. As described earlier, difference signals may be generated as various types of weighted differences. A code $C_R$ that includes the channel identification number of a master channel typically begins with a reference count code CB that indicates the count number of master channels, followed by pairs of channel identification number code $C_N$ and mode code $C_M$ of the individual master channels, as shown in FIG. 6C. A mode code $C_M$ includes, as shown in FIG. 6D for example, a factor presence code $C_D$, which indicates whether a weighting factor is present, a shift code $C_E$, which indicates whether samples are shifted, as described later, a channel/sample code $C_F$, which indicates whether a weighting factor is for a channel or samples, an adjacent sample code $C_G$, which indicates whether a weighted average of adjacent samples is used, a factor count code $C_H$, which indicate the number of weighting factors, and a factor code $C_C$ which is a coded weighting factor. These items of information about coding (coding information) may be any information, which may be arranged otherwise, that includes information indicating which of independent coding and difference coding is used, the identification number or numbers of a master channel or channels if difference coding is used, a weight or weights if a weighted difference or differences are used and, if adjacent samples are used, information indicating the use of adjacent samples and weights assigned to the adjacent samples, as described above.

What type of difference method is to be used is predetermined. The difference method used determines the codes to be contained in a mode code $C_M$. For example, if unweighted differences are used, the mode code $C_M$ is not used. If only one weighting factor is used in a frame of a channel signal of one master channel as shown in FIG. 7A, the mode code $C_M$ includes only a factor code $C_C$. If different weights are used at different sample positions as shown in FIG. 7C, factor codes $C_C$ corresponding to $\beta_f$ and $\beta_g$ are used. If predetermined multiple difference methods are used within one frame, combinations of codes in mode codes $C_M$ shown in FIG. 6D are used according to the methods in order to differentiate between them.

Others

In some cases, the degree of correlation between a master channel signal and a channel signal of interest may be increased by shifting the master channel signal by one or a few samples from the channel signal of interest. In such a case, the master channel signal Y or the channel signal of interest may be delayed by a predetermined number of samples by a shifter 231, for example as indicated by dashed lines in FIG. 7A, before inputting the signal in a calculating section 204. The method of shifting samples can be applied to a difference method without weighting, as well as a weighting difference method. If samples are shifted, a "1" is set in code $C_E$ in FIG. 6D and a code indicating the amount of shift is contained in mode code $C_M$.

In other cases, the degree of correlation between a master channel signal and a channel signal of interest can be increased by changing the frequency characteristic of the signal by passing the signal through a low-pass filter, for example. In such a case, the frequency characteristic of the master channel signal Y may be modified by a modifying section 232 as indicated by dashed boxes in FIG. 7B before providing it to a weight calculating section 204. The frequency characteristic modification can be applied to a difference method without weighting as well as a weighting difference method. How the frequency characteristic modification is to be performed is predetermined and a code indicating whether modification is applied or not is contained in reference code $C_R$.

If a weighting difference method is used, factor codes $C_C$ are also outputted and therefore the code amount may increase accordingly. Therefore, a weighted difference signal from a difference circuit 202 may be encoded in a coding section 233 as indicated by dashed lines in FIG. 5 by using the same coding method used in the signal coder 31 (FIG. 2). Similarly, a channel of interest (the first channel in this example) may be encoded in a coding section 234. The amounts of these resulting codes may be compared with each other in a comparing section 235. The amount of code of the weighted difference signal includes the amount of the reference code $C_R$ including a factor code of a weighting factor and number codes $C_N$ representing the channel identification number of the reference signals. Based on the result of the comparison in the comparing section 235, a signal code $C_S$ with a less code amount may be selected in a selector 236. The code $C_S$, together with its corresponding type code $C_A$ and, a reference code $C_R$ if a difference signal is encoded, may be provided to a combiner 300 (FIG. 2) as the channel code $C_{ch}$ corresponding to the channel signal of interest.

Process

A process of the coding method described above will be briefly described below with reference to FIG. 14. Each channel signal is divided into short-time periods (frames) (step S41). Difference signals of all pairs of two channel signals in each of the frames are generated using a predetermined method and are temporarily stored in a buffer (step S42). The energy of each of the difference signals and the energy of each channel signal itself are calculated (step S43). Decision is made as to which of independent coding and difference coding is to be used for each channel signal (step S44) in accordance with the procedure shown in FIG. 4, for example.

According to the decision, a signal to be coded is generated for each channel signal (step S45). In particular, if independent coding is used for a channel signal, the channel signal itself is to be encoded; if difference coding is used, a corresponding one of the difference signals stored in the buffer at step S42 is retrieved as a signal to be coded (step S45). The signal to be coded for each channel is encoded (step S46). In doing this, a reference code $C_R$ is also generated if the signal to be coded is a difference signal. Channel codes $C_{ch}$ of the channels are collected and are outputted as a multichannel code in the frame (step S47).

Figure 14:
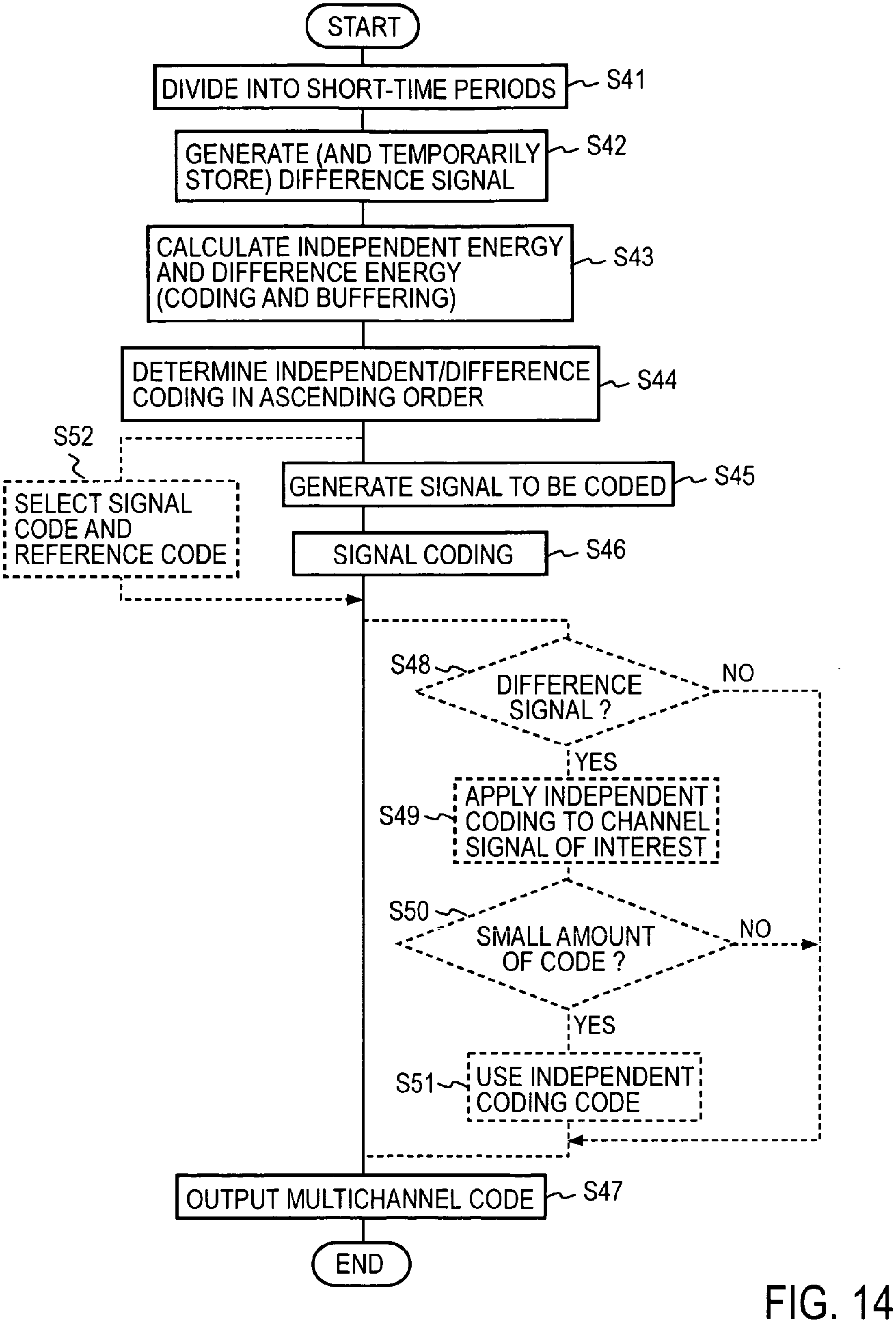
FIG. 14 is a flowchart of a process for coding according to the first embodiment.

After compressive coding at step S46, if the signal to be coded before the compressive coding was a weighted difference signal, that is, if compressive coding or difference coding was used (step S48), independent coding is applied to the channel signal to be coded (step S49), as shown in dashed blocks in FIG. 14. The amount of the code resulting from the independent coding is compared with the amount of the code resulting from the difference coding. If the amount of the code resulting from the independent coding is smaller (S50), the code resulting from the independent coding is selected as the channel code $C_{ch}$ of the channel signal of interest and then the process proceeds to step S47 (step S51). On the other hand, if the amount of the code resulting from the independent coding is not smaller, the code resulting from the difference coding performed before the independent coding is selected, that is, the process directly proceeds to step S47.

Decoding

Figure 15:
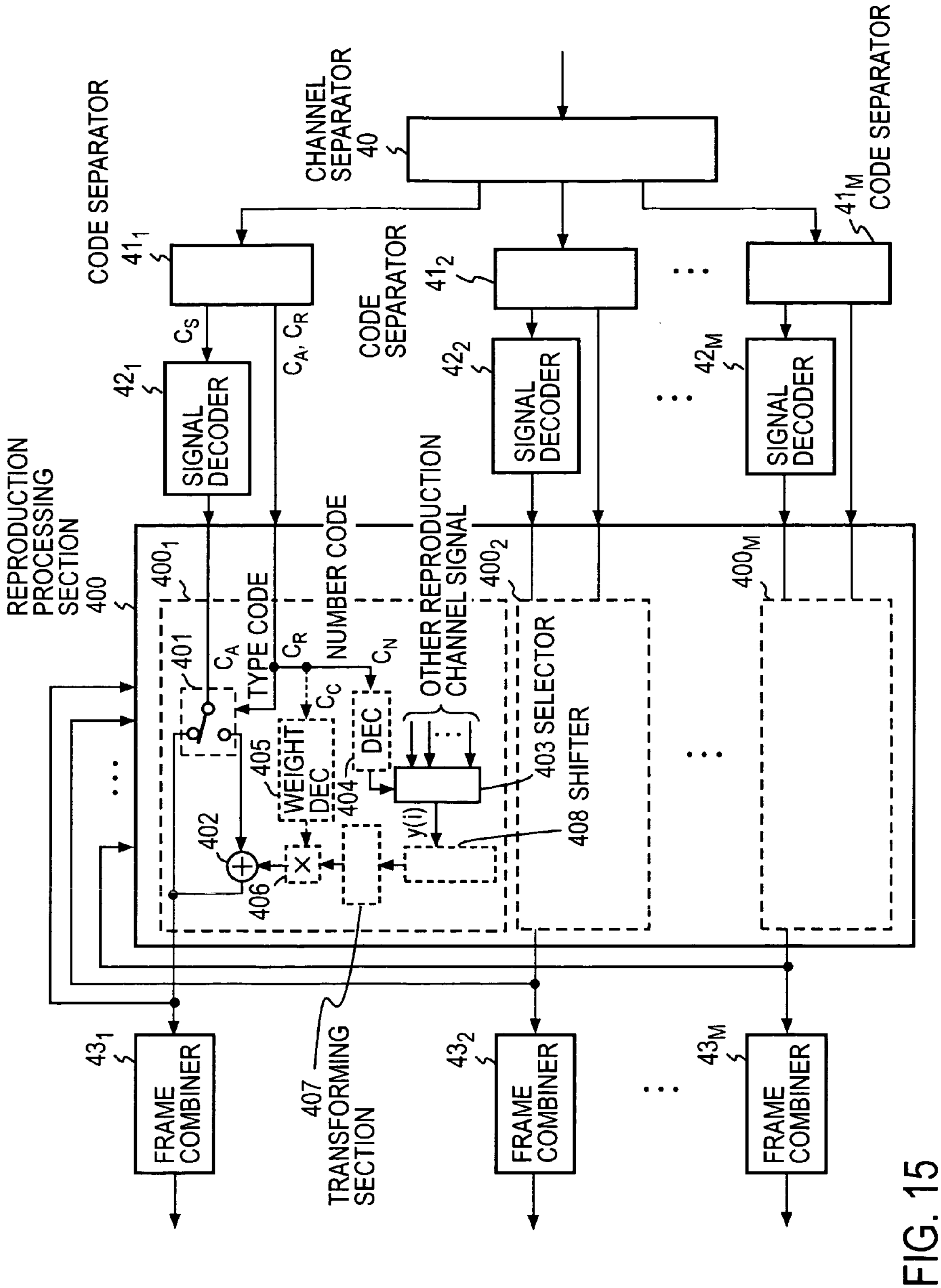
FIG. 15 is a block diagram showing an exemplary functional configuration of a decoding apparatus according to the present invention.

FIG. 15 shows an exemplary functional configuration of a decoding apparatus corresponding to the coding apparatus described above. An input multichannel code in each frame is divided into individual m-th channel code $C_{ch}$ (where m=1, . . . , M) in a channel separator 40. Each of the m-th channel codes $C_{ch}$ is separated into a signal code $C_S$ and the other codes, in the code separator $\mathbf{41}_m$. Each of the separated signal codes $C_S$ is decoded in a signal decoder $\mathbf{42}_m$. The signal decoder $\mathbf{42}_m$ corresponds to the signal coder $\mathbf{31}_m$ in FIG. 2. Accordingly, the input signal encoded in the signal coder $\mathbf{31}_m$ is decoded by the signal decoder $\mathbf{42}_m$. It should be noted that the codes other than the signal code may be separated at the code separator $\mathbf{41}_m$ before the signal code is divided into channels in the channel separator 40.

The decoded signal from each signal decoder $\mathbf{42}_m$ is provided to a reproduction processing section 400 to reproduce the m-th channel signal. In particular, a reproducing section $\mathbf{400}_m$ associated with each channel is provided in the reproduction processing section 400. Inputted in the reproducing section $\mathbf{400}_m$ are the output from the signal decoder $\mathbf{42}_m$ and codes other than the signal code Cs separated at the code separator $\mathbf{41}_m$. As shown in the reproducing section $\mathbf{400}_1$, a switch 401 is turned to a position according to a type code $C_A$ as shown within the reproducing section $\mathbf{400}_1$. If $C_A$=0, then the decoded signal inputted from the signal decoder $\mathbf{42}_1$ is directly outputted to a frame combiner $\mathbf{43}_1$ as the reproduced first channel signal.

On the other hand, if $C_A$=1, the switch 401 is turned to the position associated with an adder 402 and the decoded signal is provided from the signal decoder $\mathbf{42}_1$ to the adder 402. In this case, a reference signal $C_R$ is also inputted from the code separator $\mathbf{41}_1$ and its number code $C_N$ controls a selector 403 to select a code specified by $C_N$ from other reproduced channel signals. The selected code is provided to the adder 402 as a channel signal y(i) of a master channel. The adder 402 adds the master channel signal y(i) selected by the selector 403 to the decoded signal x(i) provided from the signal decoder $\mathbf{42}_1$, and outputs the sum to the frame combiner $\mathbf{43}_1$ as the reproduced first channel signal. The frame combiner $\mathbf{43}_1$ combines the frames of the inputted reproduced first channel signal in the order of frame number. The number code $C_N$ is decoded at a number decoder 404 if required. However, if channel identification numbers are converted into binary numbers and the binary numbers are used as number codes $C_N$, the number decoder 404 is not required.

If a reference code $C_R$ includes a factor code $C_C$, the factor code $C_C$ is decoded into a weighting factor β at a weight decoder 405. The master channel signal from the selector 403 is multiplied by the weighting factor β at a multiplier 406 and the result is provided to an adder 402. It should be noted that if the modifying section 232 of the coding apparatus has modified the frequency characteristic of the master channel signal as shown in FIG. 7B, for example, a modifying section 407 modifies the frequency characteristic of the master channel signal provided from the selector 403 in the same manner. A code indicating whether the modification should be applied or not is also included in the reference code $C_R$. If the shifter 231 of the coding apparatus has shifted the master channel signal by a number of samples as shown in FIG. 7A, a shifter 408 shifts the reference signal selected by the selector 403 by the number of samples and provides the result to the adder 402. The shifter 408 is controlled by a code included in the reference signal $C_R$ that represents the number of samples by which the signal is to be shifted.

Figure 16A:
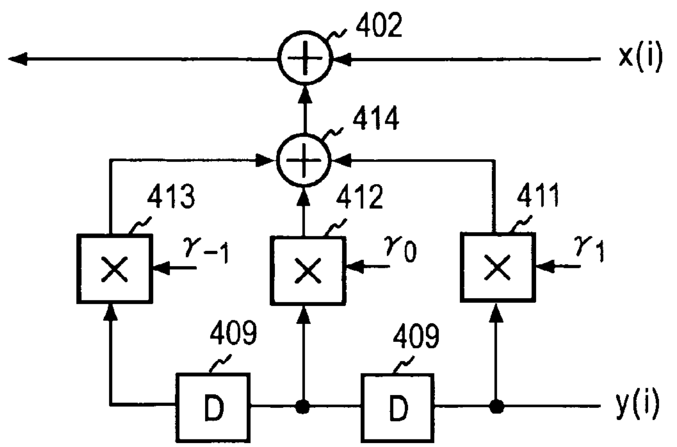
FIG. 16A shows an exemplary functional configuration of a weighted addition signal generating section using three samples.

If a weighted average of samples including adjacent samples is used in the coding apparatus as shown in FIG. 8, the reference signal y(i) is sequentially delayed by 1 sample at each of two unit delay sections 409 as shown in FIG. 16A. Multipliers 411, 412, and 413 multiply the undelayed signal y(i), the signal y(i) delayed by 1 sample, and the signal y(i) delayed by 2 samples by the $\gamma_1$, $\gamma_0$, and $\gamma_{-1}$, respectively. An adder 414 adds the outputs from the multipliers 411, 412, and 413 together and provides the sum to the adder 402.

If the weight varies according to the positions of the samples in the coding apparatus as shown in FIG. 10, decoded weighting factors $\beta_f$ and $\beta_g$ and the functions f(i) and g(i) are used to perform the same process as shown in FIG. 10 on the master channel signal y(i) in the decoding apparatus. The adder 402 adds the result of the process to the decoded signal x(i).

Figure 16B:
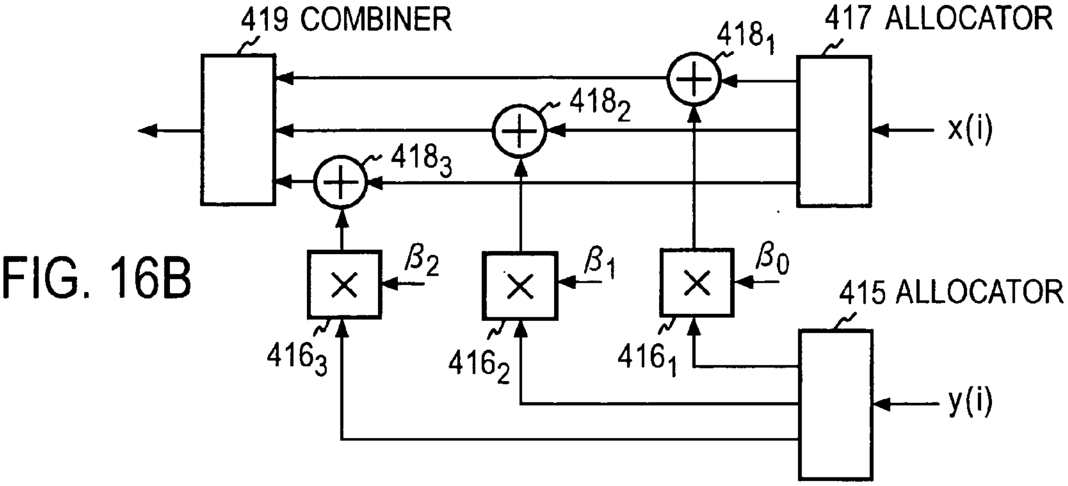
FIG. 16B shows an exemplary functional configuration of a weighted addition signal generating section for three separate series.
Figure 16C:
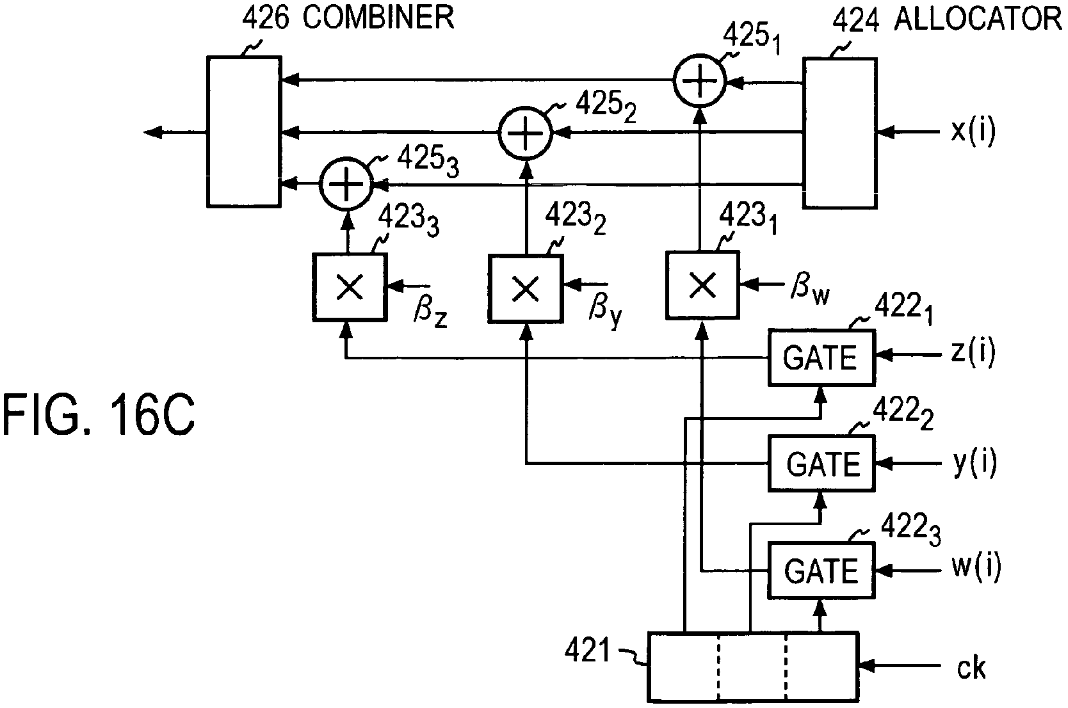
FIG. 16C shows an exemplary functional configuration of a weighted addition signal generating section for three master channels.

If a weighted difference calculation as shown in FIG. 11 has been performed in the coding apparatus, an allocator 415 allocates the master channel signal y(i) to three separate series sample by sample in order as shown in FIG. 16B. Multipliers $\mathbf{416}_1$, $\mathbf{416}_2$, and $\mathbf{416}_3$ multiply the signals in three series by decoded weighting factors $\beta_0$, $\beta_1$, and $\beta_2$, respectively. The decoded signal x(i) is allocated to three separate series at an allocator 417. The signals in the three separate series are added in the adder $\mathbf{418}_1$ $\mathbf{418}_2$ and $\mathbf{418}_3$ to the outputs from the multipliers $\mathbf{416}_1$, $\mathbf{416}_2$, and $\mathbf{416}_3$, respectively, and combined into one series at a combiner 419.

If the weighted difference calculation shown in FIG. 13 is performed in the coding apparatus, it may be arranged as shown in FIG. 6C such that gates $\mathbf{422}_1$, $\mathbf{422}_2$, and $\mathbf{422}_3$ sequentially separate three channel signals w(i), y(i), and z(i) of the three master channels selected based on reproduced channel signals into three sample series according to outputs from the counting stages of a ternary counter 421 that counts sample clocks ck. Multipliers $\mathbf{423}_1$, $\mathbf{423}_2$, and $\mathbf{423}_3$ multiply the three master channel signals w(i), y(i), and z(i) by decoded weighting factors $\beta_W$, $\beta_y$, and $\beta_z$, respectively. An allocator 424 allocates the decoded signal x(i) into three separate series. The signals in the three separate series are added to the outputs from the multiplier $\mathbf{423}_1$, $\mathbf{423}_2$, and $\mathbf{432}_3$ at adder $\mathbf{425}_1$, $\mathbf{425}_2$, and $\mathbf{425}_3$, respectively, and the sums are added together into one series at a combiner 426.

Second Embodiment

According to a second embodiment of the present invention, at least one channel signal is chosen to be independently coded, then the difference signal between the channel signal to be independently coded and each of channel signals for which the type of coding is not yet to be determined is generated, and the channel signal that will result in the smallest code amount is selected as the signal with which difference coding is to be performed. This process is sequentially repeated.

Figure 17:
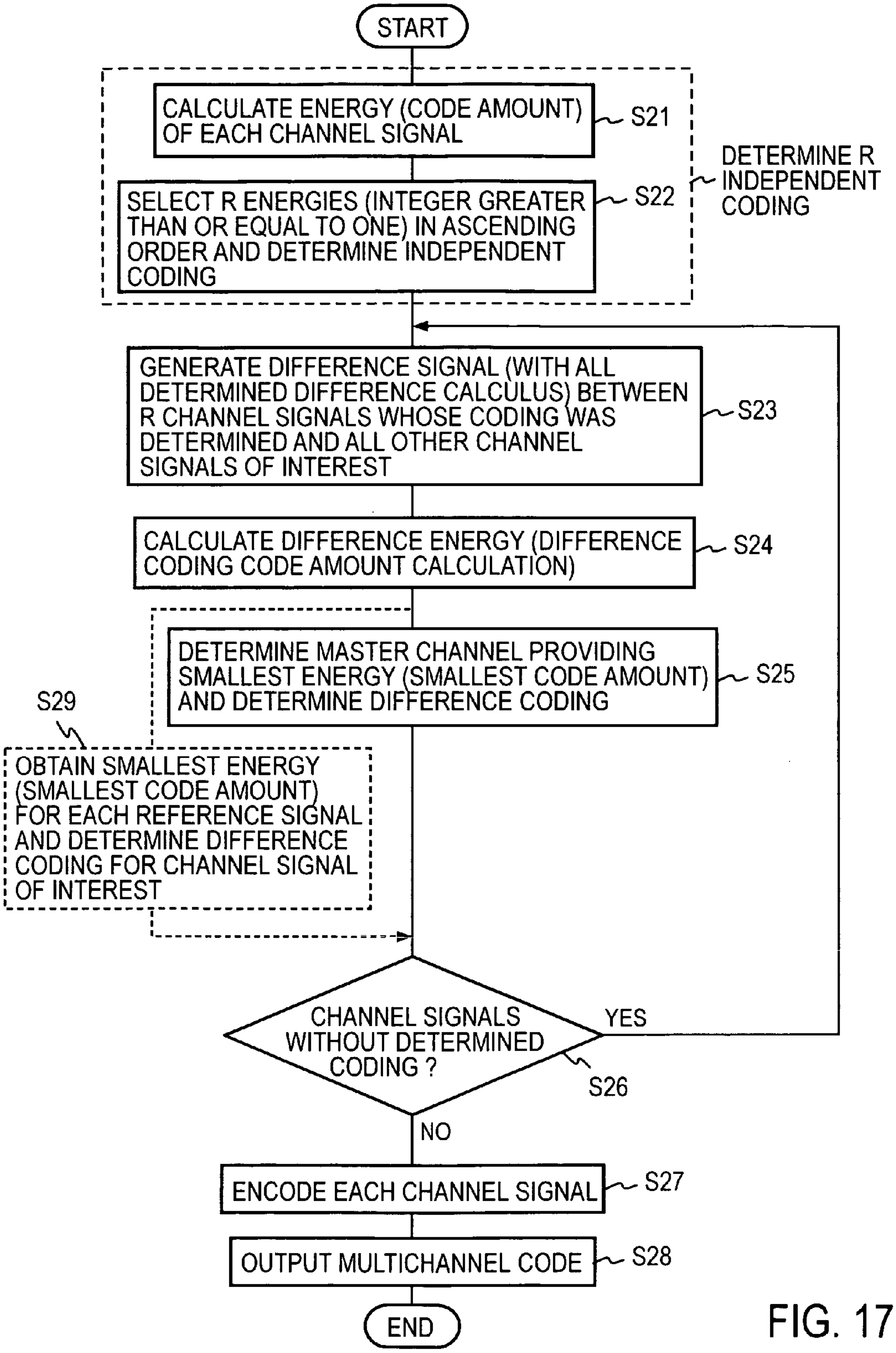
FIG. 17 is a flowchart of an exemplary process for coding according to second and third embodiments.
Figure 18:
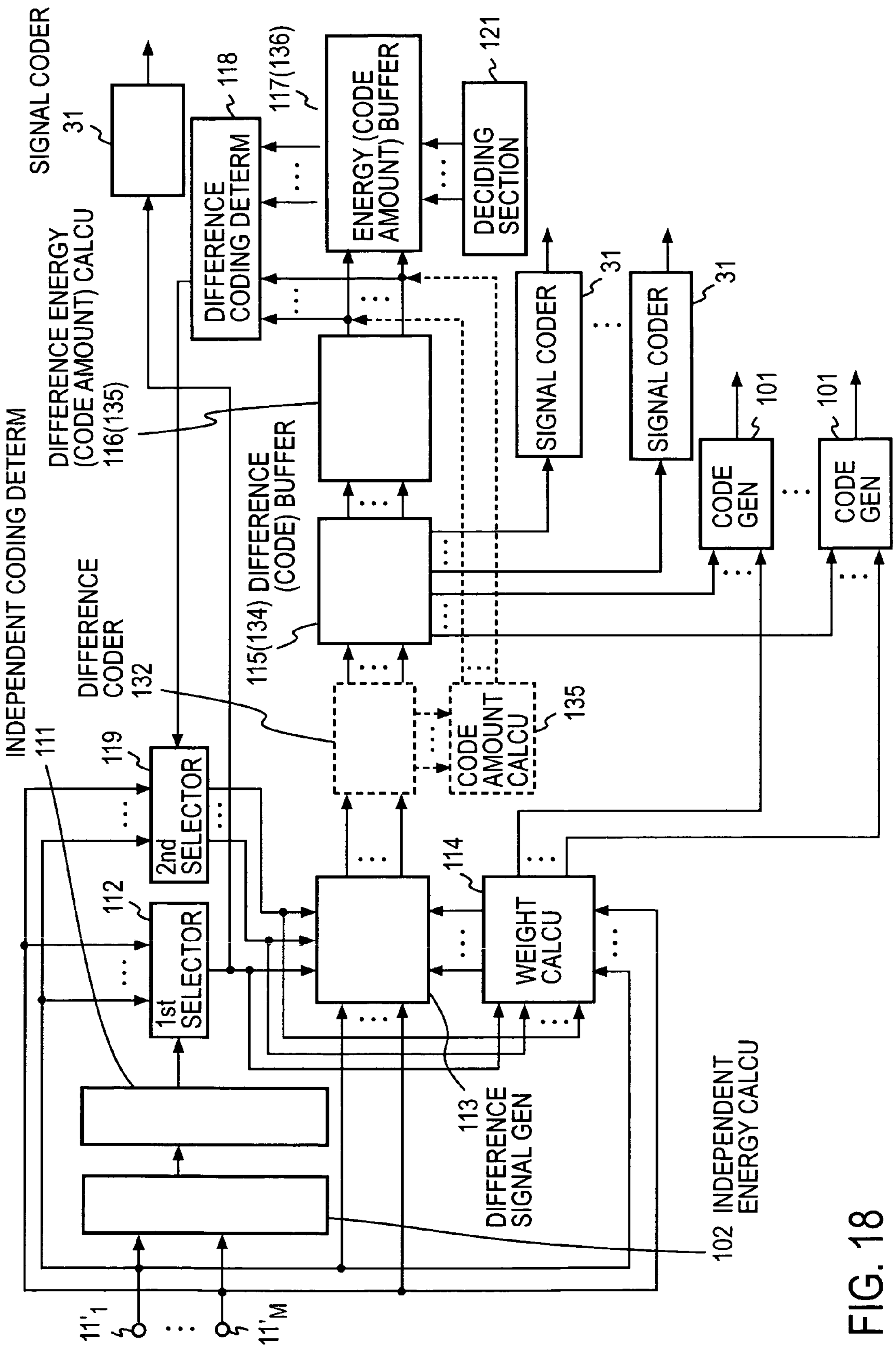
FIG. 18 is a block diagram showing an exemplary functional configuration of a coding apparatus according to the second embodiment.

FIG. 17 shows a process performed in a coding apparatus according to the second embodiment and FIG. 18 shows an exemplary functional configuration of the coding apparatus. The frame divider is omitted from FIG. 18 and input terminals of frame-divided channel signals are denoted by $\mathbf{11}_1'$, . . . , $\mathbf{11}_M'$. First, a predetermined number R of channel signals are chosen to be independently coded (where R is an integer greater than or equal to 1). It may be predetermined that a first channel signal, for example, is to be independently coded. Preferably, an independent energy calculating section 102 calculate the independent energy of every channel signal (step S21) and an independent coding determining section 111 selects the first to the R-th smallest energies calculated and then chooses the R channel signals corresponding to the R energies as signals to be independently coded (step S22).

Then, a difference signal generator 113 uses each of the channel signals chosen to be independently coded as a reference signal to generate a difference signal between each reference signal and every other channel signal (step S23). On completion of selection of the R channel signals to be independently coded, a first selector 112 selects the R channel signals as master channel signals. It should be noted that the difference calculation at step S23 may be a predetermined method, which may be any of the methods described with respect to the first embodiment. If weighted differences are used, a weighting factor or factors that depend on the weighting method used is calculated at a weight calculating section 114. A difference buffer 115 stores generated difference signals in association with the identification numbers of the channel signals of interest and the master channels. Then, a difference energy calculating section 116 calculates the energies of the difference signals (step S24). The calculated energy values are buffered in an energy buffer 117 in association with the identification numbers of the channel signals of interest and the identification numbers of the reference signals.

A difference signal determining section 118 selects the master channel in which the energy of the difference from a channel signal of interest for which coding is not yet to be determined is the smallest among the energy values stored in the energy buffer 117 and determines that the channel signal of interest is to be difference-coded (step S25). The channel signal to be difference coded is selected by a second selector 119 and is provided to a difference signal generator 113. Once selected a channel signal, the first and second selectors 112 and 119 retain the selection state.

A deciding section 121 decides from, for example, the information stored in the energy buffer 117, whether there remains a channel signal for which the type of coding is not yet to be determined (step S26). If there remains a channel signal, the process returns to step S23. If the type of coding has been determined for all channel signals, each of the channel signal is encoded in a signal coder 31 according to the determined coding type (step S27). For difference coding, the difference signal stored in the difference buffer 115 may be provided to a signal coder 31 of the corresponding channel. A type code $C_A$ and a reference code $C_R$ corresponding to the signal code of each channel signal are generated by a code generator 101. Although not shown in the drawings, signals are combined into a multichannel code in a synthesizing section and the multichannel code is outputted in the similar manner as in the first embodiment (step S28).

While one or more channel signals are chosen to be independently coded in the second embodiment, a channel signal, for example the first channel signal, may be predetermined to be independently coded. In that case, the type code $C_A$ can be omitted because the decoding end knows beforehand which channel signal is independently coded.

Decoding of the multichannel code in the second embodiment is the same as the decoding in the first embodiment.

Although the amount of the code may be somewhat increased, step S29 may be performed instead of step S25 as indicated by a dashed line in FIG. 17 in order to simplify the process. In this case, a channel signal of interest that provides the smallest difference energy is obtained for each master channel and is chosen to be difference-coded. By doing this, the number of channel signals chosen to be difference-coded doubles each time the process is repeated.

Third Embodiment

According to a third embodiment of the present invention, a difference method that will result in the smallest code amount is selected from among plural predetermined difference methods and the difference coding is performed.

Figure 19:
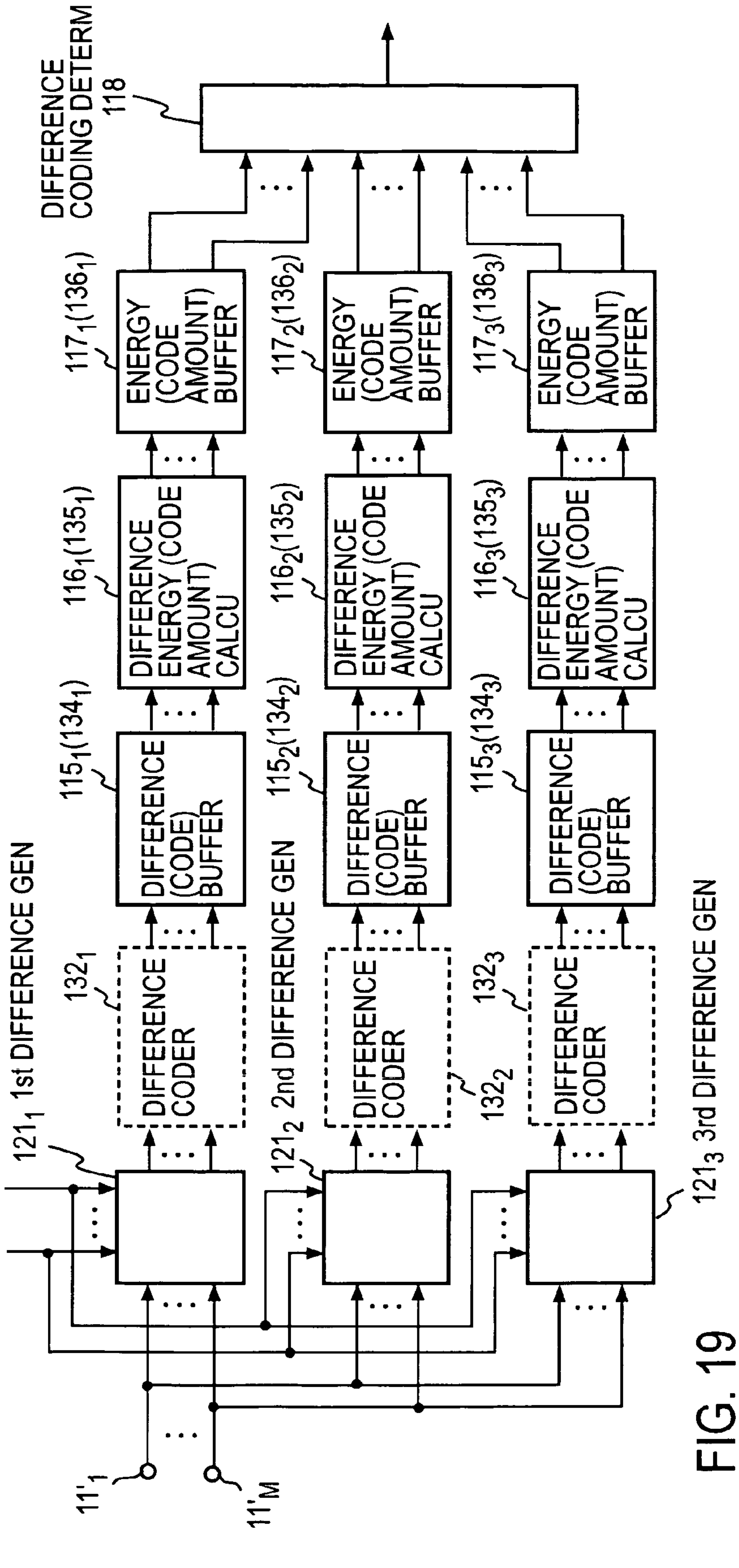
FIG. 19 is a block diagram showing an functional configuration of main portion of a coding apparatus according to the third embodiment.
Figure 20:
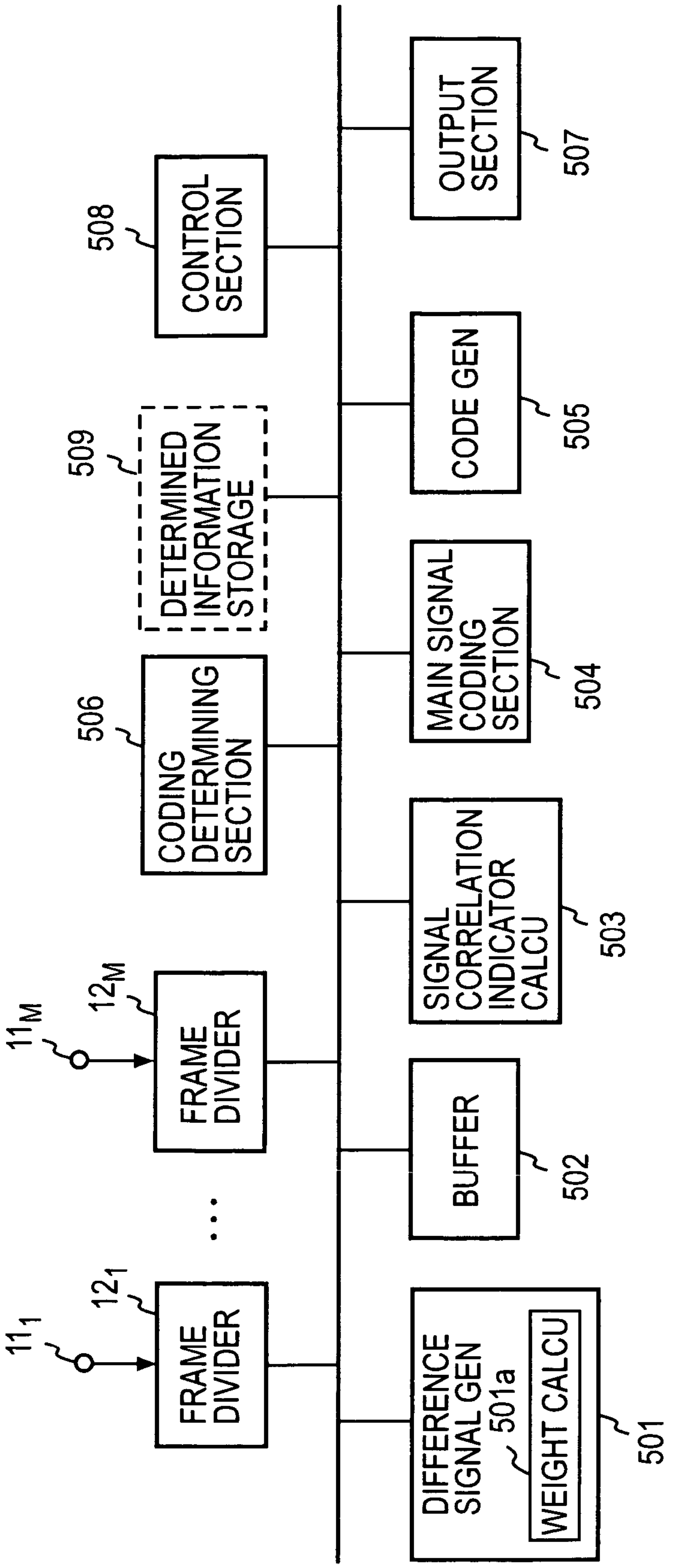
FIG. 20 is a block diagram showing an exemplary functional configuration according to an embodiment of the present invention.

As with the second embodiment, R channel signals are first chosen to be independently coded in the third embodiment. Then, difference signals are generated according to the multiple predetermined difference methods. For example, as shown in FIG. 19 first to third difference generators $\mathbf{121}_1$, $\mathbf{121}_2$, and $\mathbf{121}_3$ generate difference signals by using channel signals for which the types of coding have been determined as master channel signals and channel signals for which the types of coding are not yet to be determined as channel signals of interest. One of the three difference generators 121 may generate unweighted difference signals. If a difference generator generates a weighted difference signal, the difference generator 121 also generates a weighting factor for a predetermined weighted difference method. The operation is shown in the parentheses in step S23 in FIG. 17.

The difference signals thus generated are buffered in difference buffers $\mathbf{115}_1$, $\mathbf{115}_2$, and $\mathbf{115}_3$ and then their energies are calculated in difference energy calculating sections $\mathbf{116}_1$, $\mathbf{116}_2$, and $\mathbf{116}_3$ and are stored in energy buffers $\mathbf{117}_1$, $\mathbf{117}_2$, and $\mathbf{117}_3$, respectively. A difference coding determining section 118 selects the master channel that provides the smallest energy of the difference from a channel signal for which the type of coding has not yet been determined and determines that the channel signal of interest is to be difference-coded using the predetermined coding method. This operation is shown in the parentheses in step S29 in FIG. 17.

The remaining part of the process is the same as that in the second embodiment. That is, one of plural (three in this example) difference signal generating methods that is presumed to provide the smallest code amount is selected for each channel signal in the third embodiment. After coding methods are determined for all channel signals of interest, a difference method code $C_I$ indicating which of the difference methods was used is included in the reference code $C_R$. For example, if three difference methods are provided as in this example, any of 00, 01, and 10 is included in the reference code $C_R$ as a difference method code $C_I$. Alternatively, if a mode code $C_M$ as shown in FIG. 6D is used and the mode code $C_M$ itself determines a difference method, the difference method code $C_I$ can be omitted.

If a difference method is to be selected from among multiple difference methods in this way, a channel signal of interest and a difference method that provide the smallest difference energy may be selected for each reference signal at step S29 in order to reduce the amount of information to be processed.

Fourth Embodiment

According to a fourth embodiment of the present invention, the amounts of codes resulting from independent and difference coding of channel signals are obtained and then independent coding or difference coding, whichever provides a smaller amount of the entire code, is chosen.

For example, an independent coding section 131 of an independent/difference determining section 100 codes all channel signals as indicated by dashed lines in FIG. 2. A difference section 103*b* generates difference signals between all possible pairs of two channel signals by using a predetermined difference method. A difference coder 132 encodes the difference signals to generate reference codes. A code amount calculating section 133 calculates the amount of each code coded in an independent coding section 131 and the amount of the code of each pair coded in the difference coder 132. The amounts of the codes are arranged in ascending order of amount, that is, in descending order of correlation between signals, in an ascending ordering section 104. A serial processing section 105 sequentially determines, in ascending order of code amount, which of independent coding and difference coding should be applied to the corresponding input channel signals. The determination may be made through the method shown in FIG. 4 by using code amounts instead of energies.

The process after coding methods are determined may be performed in the same way described above. However, because each channel signal has been already coded, corresponding signal codes $C_S$ and the type code $C_A$ and reference code $C_R$ are selected as channel codes in accordance with the coding of the channel signals. In particular, as shown in the parentheses in step S43 of the process shown in FIG. 14, each channel signal and each difference signal are coded and the codes are buffered, instead of calculating energy. Determination is made based on the amount of the codes at step S44 as to which of independent coding and difference coding should be performed. At step S52, a corresponding signal code $C_S$ and type code $C_A$ or reference code $C_R$ are taken from the buffer as channel codes of the input channel signal and then the process proceeds to step S47.

If at least one input channel signal to be independently coded is determined first as with the second embodiment, operations as described below may be performed. For example, as represented by dashed lines and parentheses in FIG. 18, a difference coder 132 encodes each difference signal generated in a difference signal generator 113 and stores the signal code $C_S$ and reference code $C_R$ in a code buffer 134. A code amount calculating section 135 calculates the amounts of codes other than the signal code $C_S$ and reference code $C_R$ and stores them in a code amount buffer 136. A difference coding determining section 118 uses the code amounts stored in the code amount buffer 136 to determine a channel signal of interest and a master channel signal that provide the smallest code amount in the same way performed for difference energies described above. The remaining part of the process is the same as the corresponding part of the process in the second embodiment.

At step S24 of the process shown in FIG. 17, each difference signal is coded into a difference code, the amount of the code is calculated, and the difference codes ($C_S$ and $C_R$) are stored in a buffer. At step S25, a channel signal of interest and a reference signal that provide the smallest code amount are obtained. At step S27, the signal code $C_S$ and reference code $C_R$ of the channel signal is retrieved as a channel code from the buffer 134 on the basis of the result of determination at step S25 and then the process proceeds to step S28.

At step S29 indicated by a dashed box in FIG. 17, the smallest code amount, instead of the smallest energy, for each reference signal is obtained to determine difference coding for the channel signal of interest.

If one of predetermined multiple difference methods that will result in the smallest code amount is to be chosen as with the third embodiment, the fourth embodiment can be applied. In that case, for example difference signals generated in the first to third difference generators $\mathbf{121}_1$, $\mathbf{121}_2$, and $\mathbf{121}_3$ are difference-coded in difference coders $\mathbf{132}_1$, $\mathbf{132}_2$, and $\mathbf{132}_3$, respectively, as indicated in dashed boxes and parentheses in FIG. 19. The pairs of difference codes (signal code $C_S$ and reference code $C_R$) are stored in code buffers $\mathbf{134}_1$, $\mathbf{134}_2$, and $\mathbf{134}_3$. Code amount calculating sections $\mathbf{135}_1$, $\mathbf{135}_2$, and $\mathbf{135}_3$ calculate the amounts of the difference codes and store them in code amount buffers $136_1$, $136_2$, and $136_3$, respectively. A difference coding determining section 118 determines a master channel that minimizes the amount of the code of a channel signal of interest for which the type of coding has not yet been determined in the code amount buffers $136_1$, $136_2$, and $136_3$. A signal code $C_S$ and a reference code $C_R$ for each input channel signal may be selected from the code buffers $134_1$, $134_2$, and $134_3$ and may be outputted as channel codes. The remaining part of the process is performed as described above.

Again, an input channel signal for which the type of coding has been determined may be used as a reference signal and the type of coding used for a channel signal for which the type of coding has not yet been determined may be determined for the reference channel.

[Generalization]

In the forgoing, determination is made first as to which of independent coding and difference coding should be applied to each input channel signal, and then the input channel signal is encoded according to the determination. However, an input channel signal for which the type of coding has been determined may be encoded while at the same time determination as to which of independent coding and difference coding should be used is being made.

As will be understood from the embodiments described above, the first to M-th channel signals divided into frames at frame dividers 121, . . . , $12_M$ are processed frame-period by frame-period. Therefore, at least the following components are provided according to the present invention.

(1) A difference signal generator 501, which includes a weight calculating section 501*a* if needed;

(2) A buffer 502 which stores a difference signal, information indicating which of independent coding and difference coding is used, information indicating the identification number of a master channel, independent energy values, difference energy values, and the amount of codes;

(3) A signal correlation indicator calculating section 503 which calculates an indicator corresponding to correlation between channels such as a difference energy or the amount of a difference code;

(4) A main signal coding section 504 which encodes a channel signal or a difference signal;

(5) A code generator 505 which generates information such as information indicating which of independent coding and difference coding is used and information specifying the identification number of a master channel;

(6) A coding determining section 506 which makes determination as to which of the channels should be used as the master channel for difference coding of a channel signal and also determines whether independent coding should be applied as required;

(7) An output section 507 which outputs channel codes of channel signals as a multichannel code;

(8) A control section 508 controlling reads and writes in buffers and controlling components to operate appropriately; and (9) A determined information storage 509 which stores information indicating the type of coding determined for each channel at the coding determining section 506 as required.

Figure 1B:
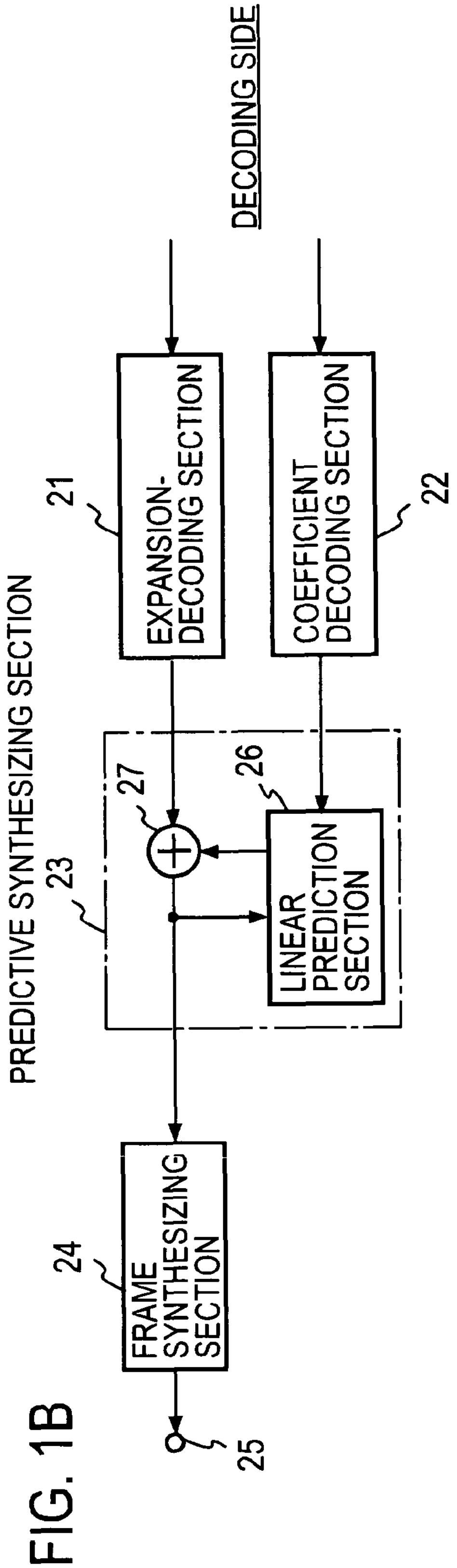
FIG. 1B is a block diagram showing a functional configuration at a decoding end in the conventional linear prediction coding method.

An input multichannel signal may be a prediction error signal from the prediction error generating section 16 in FIG. 1, linear predictive coefficients from the linear prediction analyzing section 13, auxiliary information such as PARCOR parameters.

A computer may be caused to function as any of the coding apparatuses shown in FIGS. 2, 18, and 19, namely the coding apparatuses according to various embodiments and the decoding apparatus shown in FIG. 15. In that case, a program that causes the computer to perform processes of relevant methods may be installed in the computer from a recording medium such as a CD-ROM, a magnetic disk, or a semiconductor storage device or may be downloaded over a communication network, and may cause the computer to execute the program.

What is claimed is:

1. A multichannel signal coding method for dividing an input signal of each channel, hereinafter referred to as a channel signal, into a plurality of digital sample value sequences, hereinafter referred to as frames, and coding the channel signal, comprising the steps of:

determining whether a channel signal to be coded is to be independently coded, hereinafter referred to as independent coding, or to be coded using the difference, hereinafter referred to as difference coding, from a channel signal of another channel hereinafter referred to as a master channel, and, if difference coding is to be used, determining an identification number of the master channel;

coding, at a coding unit, the channel signal according to the determination; and generating a code sequence including the coded channel signal and information about coding that identifies which of independent coding and difference coding is used for coding of the channel and, if difference coding is used, further specifies the identification number of the master channel hereinafter referred to as coding information.

2. The multichannel signal coding method according to claim 1, wherein:

the difference coding is weighted difference coding using a weighted difference from the master channel; and if difference coding is to be used, the determining step further determines a weight to be assigned to the master channel; and if difference coding is used, the code sequence generating step generates a code sequence including coding information further identifying the weight assigned to the master channel.

3. The multichannel signal coding method according to claim 2, wherein the coding information that identifies which of independent coding and difference coding is used for coding of each channel and further specifies the identification number of the master channel used in difference coding is the identification number of the channel if independent coding is used for the channel, or the identification number of the master channel if difference coding is used for the channel.

4. The multichannel signal coding method according to claim 2, wherein a channel signal of one master channel or channel signals of a plurality of master channels are used for the difference coding.

5. The multichannel signal coding method according to claim 2 or 3, comprising the determining step of calculating the amount of a code generated by the weighted difference coding of a channel signal determined to be coded using difference coding and the amount of a code generated by the independent coding of the channel signal and, if the amount of the code generated by the independent coding is smaller than the amount of the code generated by the difference coding, determining that the channel signal is to be coded using the independent coding.

6. The multichannel signal coding method according to claim 2 or 3, wherein the coding step uses a plurality of sample value sequences of a master channel at different time positions and a weighting factor for each of the sample value sequences to perform difference coding of a channel signal determined to be coded using difference coding.

7. The multichannel signal coding method according to claim 1, wherein the determining step determines at least one channel signal to be independently coded, calculates the difference indicator between channel signals for channel signals other than the one channel signal, and determines that difference coding is to be used for channel signals, in ascending order of the difference indicator.

8. The multichannel signal coding method according to claim 1, wherein an indicator corresponding to the amount of a code generated by coding a channel signal to be coded, hereinafter referred to as the independent indicator, and an indicator corresponding to the amount of a code generated by coding a difference signal between the channel signal and another channel signal, hereinafter referred to as the difference indicator, are obtained for each frame and determination is made from the obtained independent indicator and difference indicator as to which of independent coding and difference coding is to be applied to the channel signal to be coded.

9. The multichannel signal coding method according to claim 8, wherein the independent indicators of all channel signals and the difference indicators between channel signals are calculated and determination is made, in ascending order of the indicators, as to which of independent coding and difference coding is to be used for coding of channels corresponding to the indicators.

10. The multichannel signal coding method according to claim 9, wherein the indicator is energy and the determining step determines, in ascending order of energy,

- if the energy is the energy of a channel signal itself and the type of coding for the channel signal has not been determined, that the channel signal is to be coded using independent coding;
- if the energy is the energy of a difference signal and the type of coding for one of a pair of channels has been determined, that the channel signal is to be coded by using difference coding using the channel for which the coding type has been determined as a maser channel; and
- if the energy is the energy of the difference signal and the type of coding has been determined for neither of a pair of channel signals, one of the channel signal is determined to be coded using independent coding and the other channel signal is determined to be coded by using difference coding using the channel determined to be coded using independent coding as a master channel.

11. The multichannel signal coding method according to any of claims 8 or 7, wherein the independent indicator and the difference indicator in the determining step are signal energies.

12. The multichannel signal coding method according to claim 8, wherein the independent indicator and the difference indicator in the determining step are the amounts of a code resulting from coding of a signal.

13. The multichannel signal coding method according to claim 8, wherein the determining step comprises:

- a first step of determining that independent coding is used for coding R channel signals, where R is an integer greater than or equal to 1;
- a second step of generating a difference signal between one channel signal for which the type of coding has not been determined and each of the R channel signals;
- a third step of calculating the difference indicator from the difference signal;
- a fourth step of choosing a channel the difference indicator of which is the smallest among the R channels as a master channel for the channel for which the type of coding has not been determined; and
- a fifth step of repeating the second to fourth steps until master channels for all channel signals other than the R channel signals for which independent coding is to be used are determined.

14. A multichannel signal decoding method comprising:

- an information obtaining step of obtaining, from an input multichannel code, a code data on each channel signal and coding information for identifying which of independent coding and difference coding is used for coding each channel and, if difference coding is used, further specifying an identification number of a master channel;
- a step of decoding, at a decoding unit, code data on each channel signal to obtain a decoded signal; and
- a channel signal reproducing step of, if a channel signal is a signal coded using independent coding, providing a decoded signal as a reproduction channel signal of the channel, and if the channel signal is a signal coded using difference coding, providing the sum of a decoded signal and the reproduction channel signal of the channel signal indicated by the coding information as the reproduction channel signal.

15. The multichannel signal decoding method according to claim 14, comprising a channel signal reproducing step of, if coding information about a channel signal indicates the identification number of the channel, providing a decoded signal as a reproduction channel signal of the channel, and if coding information about a channel signal indicates the identification number of another channel, providing the sum of a decoded signal and a reproduction channel signal of the channel signal indicated by the coding information as a reproduction channel signal.

16. The multichannel signal decoding method according to claim 14, comprising:

- the information obtaining step of further obtaining coding information for identifying a weight of a master channel from an input multichannel code if difference coding is used; and
- the channel signal reproducing step of, if coding of a channel signal is difference coding, providing as a reproduction channel signal the result of weighted addition of a decoded signal and the reproduction channel signal of the channel signal indicated by the coding information.

17. The multichannel signal decoding method according to claim 16, comprising a channel signal reproducing step of, if coding information about a channel signal indicates the identification number of the channel itself, providing a decoded signal as a reproduction channel signal of the channel; if the coding information about a channel signal indicates the identification number of other channel, providing as a reproduction channel signal the result of weighted addition of a decoded signal and the reproduction channel signal of the channel signal indicated by the coding information.

18. The multichannel signal decoding method according to claim 16 or 17, wherein the coding information includes weighting factors for a plurality of sample value sequences of a master channel at different time positions if the coding information indicates difference coding; and

- the channel signal reproducing step obtains the reproduction channel signal of the channel by weighted addition including the plurality of sample value sequences if the coding of the channel signal is difference coding.

19. A multichannel signal coding apparatus which divides an input signal of each channel, hereinafter referred to as a channel signal, into a plurality of digital sample value sequences, hereinafter referred to as frames, and outputs an independently coded code generated by coding a channel signal by itself frame by frame and a difference-coded code generated by coding a difference signal between a channel signal and a channel signal of another channel hereinafter referred to as a master channel, the apparatus characterized by comprising:

- a difference signal generator which generates a difference signal between a channel signal and a master channel;
- an intersignal indicator calculating section which receives the generated difference signal and calculates an indicator indicating correlation between the channel signals; and
- a coding determining section which receives the indicator and determines which of independent coding and difference coding is to be used for each channel and, if difference coding is to be used, further determines a master channel.

20. The multichannel signal coding apparatus according to claim 19, wherein:

- the difference coding is weighted difference coding using a weighted difference from the channel signal of the master channel; and
- the coding determining section further determines a weight of a master channel if the difference coding is to be used.

21. The multichannel signal coding apparatus according to claim 20, wherein the difference signal generator uses a plurality of sample value sequences of a master channel at different time positions and a weighting factor for each of the sample values to perform difference coding of a channel signal determined to be coded using difference coding.

22. A multichannel signal decoding apparatus which obtains, from an input multichannel code, coding information for identifying which of independent coding and difference coding is used for coding each channel and, if difference coding is used, further specifying the identification number of a master channel, and obtains a code data on each channel signal, and outputs a channel signal, the apparatus comprising:

- a signal decoder which performs expansion-decoding of a signal code in a channel code; and
- a reproducing section which provides, as a reproduction channel signal of a channel code found to be independently coded, a signal generated by expansion-decoding the channel code, and provides, as a reproduction channel signal of a channel code found to be difference-coded, a signal generated by adding the expansion-decoded signal to a reproduction channel signal of a master channel.

23. The multichannel signal decoding apparatus according to claim 22, comprising the reproducing section which outputs, as a reproduction channel signal of a channel code found to be difference-coded, a signal generated by weighted addition of the expansion-decoded signal to a reproduction channel signal of a master channel.

24. The multichannel signal decoding apparatus according to claim 23, comprising the reproducing section which outputs, as a reproduction channel signal of a channel code found to be difference-coded, a signal generated by weighted addition of the expansion-decoded signal to a plurality of sample value sequences of a master channel at different time positions.

* * * * *